(12) United States Patent
Banks et al.

(10) Patent No.: US 7,239,641 B1
(45) Date of Patent: Jul. 3, 2007

(54) QUALITY OF SERVICE USING VIRTUAL CHANNEL TRANSLATION

(75) Inventors: David C. Banks, Pleasanton, CA (US); Alex S. Wang, Santa Clara, CA (US); Kreg A. Martin, Los Gatos, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 948 days.

(21) Appl. No.: 09/929,627

(22) Filed: Aug. 13, 2001

Related U.S. Application Data

(60) Provisional application No. 60/286,213, filed on Apr. 24, 2001.

(51) Int. Cl.
*H04L 12/56* (2006.01)

(52) U.S. Cl. .................. 370/397; 370/395.1; 370/398; 370/395.31

(58) Field of Classification Search ............. 370/395.1, 370/396, 397, 398, 399, 393.3, 395.31, 395.32, 370/395.42
See application file for complete search history.

(56) References Cited

U.S. PATENT DOCUMENTS

| | | | | |
|---|---|---|---|---|
| 5,583,861 A | * | 12/1996 | Holden | 370/395.42 |
| 5,844,903 A | * | 12/1998 | Terashita et al. | 370/403 |
| 5,867,499 A | * | 2/1999 | Yunten | 370/397 |
| 5,959,972 A | * | 9/1999 | Hamami | 370/228 |
| 6,178,169 B1 | * | 1/2001 | Hodgkinson et al. | 370/395.52 |
| 6,275,494 B1 | * | 8/2001 | Endo et al. | 370/395.52 |
| 6,278,714 B1 | * | 8/2001 | Gupta | 370/422 |
| 6,330,242 B1 | * | 12/2001 | Ogawa et al. | 370/395.52 |
| 6,411,617 B1 | * | 6/2002 | Kilkki et al. | 370/353 |
| 6,768,741 B1 | * | 7/2004 | Bandai et al. | 370/397 |
| 6,785,238 B1 | * | 8/2004 | Kago | 370/236.1 |
| 6,847,647 B1 | * | 1/2005 | Wrenn | 370/395.32 |
| 2002/0075798 A1 | * | 6/2002 | Sekine et al. | 370/228 |
| 2002/0163881 A1 | * | 11/2002 | Dhong et al. | 370/225 |
| 2004/0202108 A1 | * | 10/2004 | Nishimura et al. | 370/230 |

OTHER PUBLICATIONS

Brocade Communication Systems, Inc., "*Silkworm Stitch ASIC*", Rev 1.0 Sep. 6, 1996.
Brocade Communication Systems, Inc., "*Cocoon Loom ASIC*", Rev x.x Mar. 17, 1998.
K. Siu and R. Jain, "'*A Brief Overview of ATM: Protocol Layers, LAN Emulation, and Traffic Management,' Computer Communications Review*", ACM SIGCOMM, vol. 25, No. 2, Apr. 1995, pp. 6-20.
"*Asynchronous Transfer Mode Overview*", http://www.techfest.com/networking/atm/atm.htm.

(Continued)

*Primary Examiner*—Wing Chan
*Assistant Examiner*—Nguyen Ngo
(74) *Attorney, Agent, or Firm*—Wong, Cabello, Lutsch, Rutherford, & Brucculeri, LLP

(57) ABSTRACT

Virtual channels are used to improve quality of service through a large port count switch. Data frames are sent from one small switch to another small switch within the large port count switch on virtual channels. The use of virtual channels helps prevent congestion caused by a first external source device sending data to a first external destination device from affecting a second external source device sending data to a second external destination device.

40 Claims, 14 Drawing Sheets

OTHER PUBLICATIONS

Ray Jain, "*ATM Networks: An Overview*", Slideshow Presentation—The Ohio State University, pp. 1-56.

Design of VLSI Systems, Chapter 11.4, "*VLSI for Telecommunication Systems*", pp. 1-4.

Design of VLSI Systems, Chapter 11.5, "*VLSI for Telecommunication Systems*", pp. c-6.

American National Standard for Information Technology, "*Fibre Channel—Arbitrated Loop (FC-AL)*", pp. cover-90.

American National Standard for Information Technology, "*Fibre Channel—Fabric Generic Requirements (FC-FG)*", pp. cover-23.

American National Standard for Information Technology, "*Fibre Channel—Switch Fabric (FC-SW)*", pp. cover-98.

American National Standard for Information Technology, "*Fibre Channel—Switch Fabric—2 (FC-SW-2-)*", pp. cover-32, 69-118.

American National Standard for Information Technology, "*Fibre Channel—Physical and Signalling Interface (FC-PH)*", pp. cover-32, 81-132, 230-258.

American National Standard for Information Technology, "*Fibre Channel—Physical and Signalling Interface-2 (FC-PH-2)*", pp. cover-64, 79, 80.

American National Standard for Information Technology, "*Fibre Channel—Physical and Signalling Interface-3 (FC-PH-3)*", pp. cover-39.

\* cited by examiner

US 7,239,641 B1

QUALITY OF SERVICE USING VIRTUAL CHANNEL TRANSLATION

RELATED APPLICATION

This application claims priority under 35 U.S.C. §119(e) from U.S. Patent Application Ser. No. 60/286,213, entitled, "Quality Of Service Using Virtual Channel Translation," by David C. Banks and Alex Wang, filed Apr. 24, 2001, which is incorporated by reference in its entirety.

BACKGROUND

A. Technical Field

This invention generally relates to network switching devices and more particularly to Fibre Channel switching devices.

B. Background of the Invention

As the result of continuous advances in technology, particularly in the area of networking such as the Internet, there is an increasing demand for communications bandwidth. For example, the transmission of data over a telephone company's trunk lines, the transmission of images or video over the Internet, the transfer of large amounts of data as might be required in transaction processing, or videoconferencing implemented over a public telephone network typically require the high speed transmission of large amounts of data. Such applications create a need for data centers to be able to quickly provide their servers with large amounts of data from data storage. As such data transfer needs become more prevalent, the demand for high bandwidth and large capacity in data storage will only increase.

Fibre Channel is a transmission medium that is well-suited to meet this increasing demand, and the Fibre Channel family of standards (developed by the American National Standards Institute (ANSI)) is one example of a standard which defines a high speed communications interface for the transfer of large amounts of data via connections between a variety of hardware devices, including devices such as personal computers, workstations, mainframes, supercomputers, and storage devices. The Fibre Channel family of standards includes FC-PH (ANSI X3.230-1994), FC-PH-Amendment 1 (ANSI X3.230-1994/AM 1-1996), FC-PH-2 (ANSI X3.297-1997), FC-PH-3 (ANSI X3.303-1998), FC-SW (ANSI NCITS 321-1998), and FC-FG (ANSI X3.289-1996), which are fully incorporated by reference. Use of Fibre Channel is proliferating in many applications, particularly client/server applications that demand high bandwidth and low latency I/O. Examples of such applications include mass storage, medical and scientific imaging, multimedia communications, transaction processing, distributed computing and distributed database processing applications.

In one aspect of the Fibre Channel standard, communication between devices occurs through one or more Fibre Channel switches. With Fibre Channel switches having large port counts, large amounts of data can pass through the switch and congestion can result. If congestion occurs within the Fibre Channel switch, communication slows and performance suffers.

Accordingly it is desirable to provide a large port count switch with little congestion.

SUMMARY OF THE INVENTION

The described embodiments of the present invention include a method and system to prevent congestion when sending data frames through multiple small Fibre Channel switches. A small Fibre Channel switch receives a data frame through a port. The small switch determines whether the data frame has been sent using a virtual channel, and if so, the small switch determines the identity of the virtual channel. The small switch stores the data frame in a buffer associated with the receiving port, and if a virtual channel was used, the buffer is also associated with the virtual channel. The small switch determines the destination for the data frame, and uses a routing table to determine which port to send the data frame out. The small switch also determines whether a virtual channel should be used with sending the data frame, and if so, determines which virtual channel to use. If a virtual channel is used, the small switch adds information identifying the virtual channel used to an inter-frame fill word sent prior to the data frame. The small switch then sends out the data frame, and any information identifying the virtual channel used, through the determined port.

In one embodiment, a source sends the data frame to a first small Fibre Channel switch. The first small Fibre Channel switch chooses a first virtual channel, adds information identifying the first virtual channel, and sends the data frame and the information identifying the first virtual channel to a second small switch. The second small switch receives the data frame and the information identifying the first virtual channel from the first small switch, and stores the data frame in a buffer associated with the first virtual channel. The second small switch then chooses a second virtual channel, adds information identifying the second virtual channel, and sends the data frame and the information identifying the second virtual channel to a third small switch. The third small switch receives the data frame and the information identifying the second virtual channel from the second small switch, and stores the data frame in a buffer associated with the second virtual channel. The third small switch then outputs the data frame to a destination.

BRIEF DESCRIPTION OF THE DRAWINGS

FIG. 9 is a flow chart illustrating how a data frame flows through the 64-port switch using virtual channels, and detailing how the small switch determines which of the virtual channels available for general data flow to send the data frame on.

DETAILED DESCRIPTION OF THE PREFERRED EMBODIMENTS

Multi-Switch Fibre Channel Communication Network System

Figure 1:
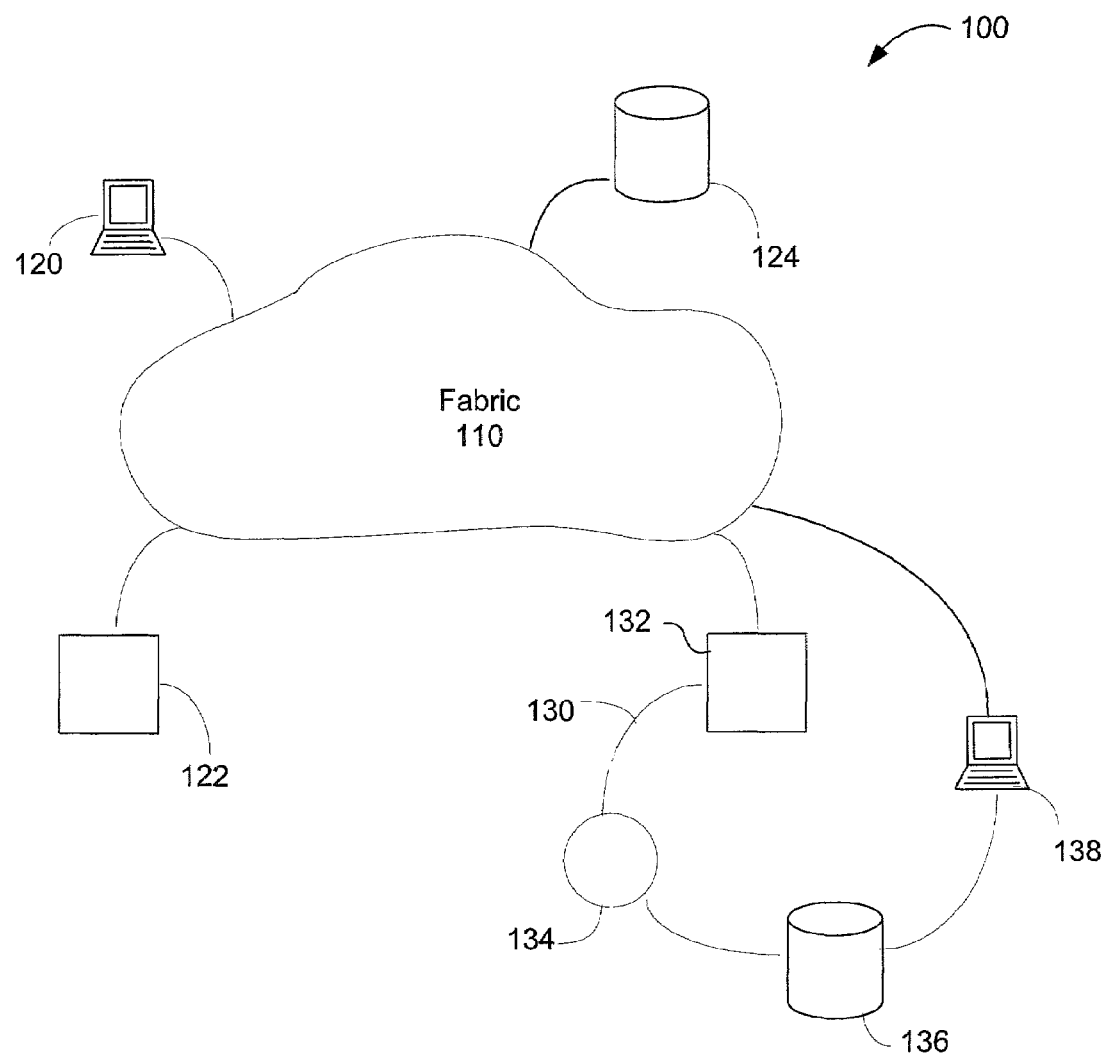
FIG. 1 is a block diagram of a communication network system.

FIG. 1 is a block diagram of an embodiment of a Fibre Channel communication network system 100 that may beneficially utilize the present invention, and may contain an embodiment of the present invention in the form of hardware. Alternatively, the present invention could be embodied in firmware or one or more software computer programs, and when embodied in software, could be downloaded to reside on and be operated from different platforms used by real-time network operating systems. The described embodiment entails the use of virtual channels to improve data flow through Fibre Channel switches or a Fibre Channel fabric.

The Fibre Channel communication network system 100 comprises a fabric 110, a plurality of devices 120, 122, 124, and/or groups of devices 132, 134, 136 and 138 as indicated with respect to loop 130. In general, fabric 110 is coupled to the various devices 120, 122, 124, and 132, and acts as a switching network to allow the devices to communicate with each other. Devices 120, 122, 124 may be any type of device, such as a computer or a peripheral, and are coupled to the fabric 110 using a point-to-point topology. Fabric 110 is also in communication with loop 130. Loop 130 includes a device 132 connected to the fabric, and other devices 134, 136, and 138, which help to form loop 130. Note that the loop 130 is shown as a logical loop, which is not necessarily the physical topology of the loop.

Figure 2:
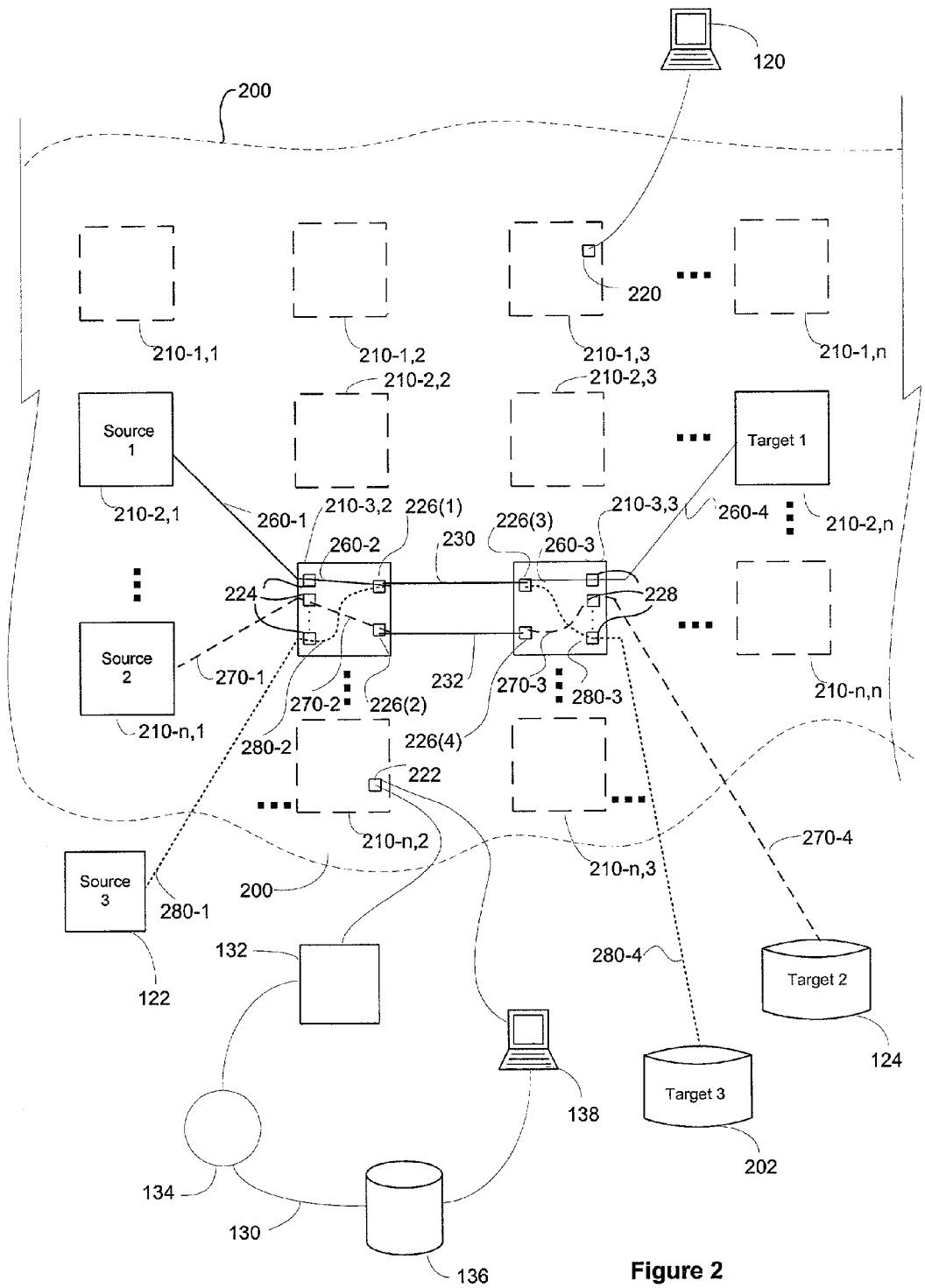
FIG. 2 is a detailed block diagram illustrating a fabric embodied by a Fibre Channel switch made up of one or more interconnected Fibre Channel small switches.

In the described embodiments to follow, fabric 110 can embody a Fibre Channel switch 200 made up of one or more interconnected Fibre Channel small switches 210-1,1 through 210-n,n, shown in the detailed block diagram of FIG. 2. It is noted however, that the invention is not limited to such fabrics or to Fibre Channel. Small switches 210-1,1 through 210-n,n, although possibly configured in a variety of manners so long as consistent with the Fibre Channel standard, will be generically referred to as "small switch 210" for the purpose of general discussion herein. As illustrated, several small switches 210 are depicted as dashed-boxes to indicate the potential breadth of the Fibre Channel network without loss of generality. Although not shown explicitly in detail, each small switch 210 is coupled to another switch or device, similar to those connections explicitly shown and as understood by those skilled in the art. Within each small switch 210, different types of ports support different types of connections from devices to a switch. For example, a fabric port (F_Port) 220 is a label used to identify a port of a switch 200 that directly couples the switch 200 to a single device 120, such as a computer or peripheral. An FL_Port (an F_Port with Arbitrated Loop capabilities) 222 is a label used to identify a port of a fabric that couples the switch 200 to a device 132 that is part of loop 130. An expansion port (E_Port) is a label used to identify a port of a small switch which is communicatively coupled to another E_Port on a corresponding small switch to create an Inter-Switch link (ISL) between adjacent small switches. A node port (N_Port) is a label used to identify a port used to couple a device (e.g., 122, 124) to the switch 200. Each physical port on a small switch 210 may function as different types of ports, such as an F_Port, an E_Port, or other port types, depending on how the port is connected. If the physical port is connected to another port on a small switch, the port functions as an E_Port. If the physical port is connected to single device, the port functions as an F_Port. The physical port similarly functions as different types of ports in addition to E_Ports and F_Ports depending on what the physical port is connected to. For the present invention, the relevant ports on small switches 210, are E_Ports (e.g., 226(x), where x=1, 2, ..., 4) as illustrated in FIG. 2.

Data travels through the switch 200 in the form of data frames. Each data frame has information identifying the destination of that frame. This information is the destination identification ("D_ID") of the data frame. In general, small switches 210 use the D_ID of the received frames to make routing decisions. Routing tables that tell the small switch 210 where to send received frames based on the D_ID are contained in the small switch 210 that receives the frame.

As seen in FIG. 2, small switch 210-3,2 includes two E_Ports 226(1), 226(2), and small switch 210-3,3 includes two E_Ports 226(3), 226(4). The E_Port 226(1) is communicatively coupled to the E_Port 226(3) by an ISL 230, while the E_Port 226(2) is communicatively coupled to the E_Port 226(4) by an ISL 232. For simplicity and without loss of generality, small switch 210-3,2 utilizes at least three input ports 224. Similarly, small switch 210-3,3 utilizes at least three output ports 228. Frames from sources comprising small switch 210-2,1 ("source 1"), small switch 210-n,1 ("source 2") and device 122 ("source 3") pass through small switches 210-3,2 and 210-3,3 to reach their final respective destinations, namely small switch 210-2,n ("target 1"), device 124 ("target 2"), and device 202 ("target 3"). As shown by solid lines, frames originating from source 1 and destined for target 1 are routed through the path 260-1, 260-2, 230, 260-3, and 260-4. As shown by dotted lines, frames originating from source 3 and destined for target 3 are routed through the path 280-1, 280-2, 230, 280-3, and 280-4. Thus, the frames from sources 1 and 3 share the routing through ISL 230.

Figure 3:
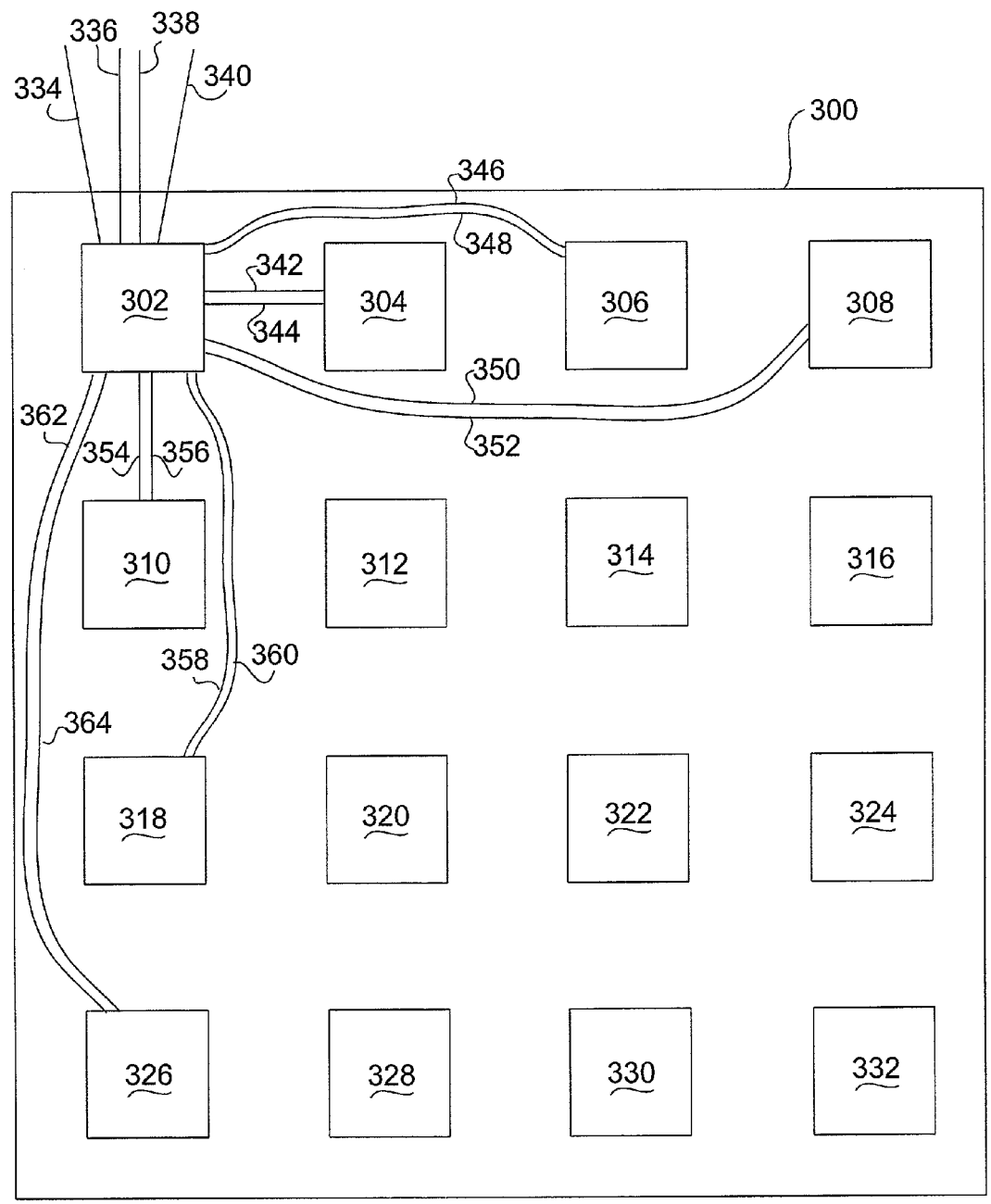
FIG. 3 is a block diagram illustrating an embodiment of a 64-port switch comprising multiple small switches.

FIG. 3 is a block diagram illustrating an embodiment where the switch 200 is a 64-port switch 300 comprising multiple small switches. The 64-port switch 300 shown in FIG. 3 is a specific embodiment of the generalized Fibre Channel switch 200 of FIG. 2. The example of a 64-port switch 300 is used to clearly disclose the use of virtual channels to improve quality of service. Utilizing virtual channels to improve quality of service works with the described embodiment of a large port count switch to overcome the drawbacks associated with conventional routing of frames along ISLs connected amongst small switches. However, the use of virtual channels to improve quality of service is not limited to such a 64-port switch 300, but can instead be used with many different Fibre Channel switches 200, or other Fibre Channel networks. For example, the use of virtual channels to improve quality of service is applicable to larger or smaller port count switches, switches comprising alternate embodiments of the small switches, and switches having different connection arrangements and routing rules amongst the small switches.

The 64-port switch 300 comprises sixteen 16-port small switches 302-332 and a processor (not shown) that interacts with all the small switches 302-332. As shown, small switches 302-332 are specific embodiments of small switches 210. Each of the 16-port small switches 302-332 is non-blocking at 2 Gigabits per second (Gbps). "Non-blocking" means that the full data rate of 2 Gbps can flow through the small switch without congestion. In the described embodiment, the 64-port switch 300 is non-blocking at input data rates of 1 Gbps.

The small switches 302-332 are arranged in four rows and four columns. Each row and column includes four of the small switches. For example, the first row includes small switches 302, 304, 306, and 308. Similarly, the first column includes small switches 302, 310, 318, and 326.

The small switches 302-332 are physically connected to other small switches by connections between E_Ports. Each small switch 302-332 is directly connected to every other small switch in the same row through two E_Ports by two ISLs, and is also directly connected to every other small switch in the same column through two E_Ports by two ISLs. Thus, each small switch 302-332 has two ISLs with every other small switch in the same row and two ISLs with every other switch in the same column. To take advantage of having two ISLs linking one small switch with another small switch within the same row and column, the two ISLs can be grouped to function as a trunked group. A trunked group of ISLs functions as a single logical ISL. One suitable method for trunking pairs of ISLs is disclosed in commonly-assigned, U.S. patent application Ser. No. 09/872,412, by David C. Banks, Kreg A. Martin, Shunjia Yu, Jieming Zhu, and Kevan K. Kwong, entitled "Link Trunking And Measuring Link Latency In Fibre Channel Fabric," filed Jun. 1, 2001, which is fully incorporated by reference herein. When the pairs of ISLs connecting small switches are trunked, the pairs of ports in small switches connected to the trunked ISLs also function as a single logical port. Thus, the term "port" as used in this application includes a single port, or multiple trunked ports that function as a single port.

Each small switch 302-332 also has four "external ports." "External ports" are ports to which devices external to the 64-port switch 300 may be connected. Thus, out of the 16-ports in each small switch 302-332, six ports are E_Ports that are connected to the other small switches in the same row by ISLs, six ports are E_Ports that are connected to the other small switches in the same column by ISLs, and four ports are external ports that are connectable to devices external to the switch 300.

Small switch 302 is typical of the small switches 302-332, and illustrates how the small switches 302-332 are arranged and connected within the 64-port switch 300. Small switch 302 is in a row of four small switches. The other small switches in the row are small switch 304, small switch 306, and small switch 308. Two E_Ports of small switch 302 are connected to two E_Ports of each of the other small switches 304, 306, and 308 in the row. Two E_Ports of small switch 302 are connected to two E_Ports of switch 304 through ISLs 342 and 344. Two E_Ports of small switch 302 are connected to two E_Ports of switch 306 through ISLs 346 and 348. Two E_Ports of small switch 302 are connected to two E_Ports of switch 308 through ISLs 350 and 352.

Small switch 302 is also in a column of four small switches. The other small switches in the column are small switch 310, small switch 318, and small switch 326. Two E_Ports of small switch 302 are connected to two E_Ports of each of the other small switches 310, 318, and 326 in the column. Two E_Ports of small switch 302 are connected to two E_Ports of switch 310 through ISLs 354 and 356. Two E_Ports of small switch 302 are connected to two E_Ports of switch 318 through ISLs 358 and 360. Two E_Ports of small switch 302 are connected to two E_Ports of switch 326 through ISLs 362 and 364.

Finally, four ports (the "external ports") of small switch 302 are connectable to external devices through connections 334, 336, 338, 340.

Each of the small switches 302-332 is similarly connected to each other small switch in the same row and each other small switch in the same column. There are sixteen small switches, each small switch having four external ports. Thus, the switch 300 has sixty-four total external ports.

There is a set of routing rules for data frames traveling through the 64-port switch 300 from an external source device (not shown in FIG. 3) to an external destination device (also not shown in FIG. 3). In one embodiment, the routing rules are stored in routing tables contained in each small switch's hardware. In general, the D_ID in received data frames are used to retrieve the correct routing for the data frame from the routing table.

When data flows through the 64-port switch, the data frame initially enters a first small switch from an external source device through one of the four externally connected ports. The external destination device may be attached to the same small switch or to another small switch within the 64-port switch 300. The data frame is first sent horizontally, if necessary, to reach the column containing the small switch connected to the external destination device. Then the data is sent vertically, if necessary, within the column to reach the small switch connected to the external destination device. Under such routing rules there is only one path between any two small switches.

For example, for a data frame entering small switch 302 from an external source no device and to be sent to an external destination device connected to small switch 322, the data frame is first sent horizontally from small switch 302 to small switch 306, the "horizontal hop." To accomplish this, small switch 302 determines the D_ID of the received data frame. For each D_ID, the routing table stores the correct identification of the port through which the small switch sends the data out to reach the data frame's destination. The small switch 302 retrieves the identification of the port from the routing table. In this case, the retrieved port is the port connected to small switch 306. The small switch 302 then sends the data frame out that port.

The data frame is next sent vertically from small switch 306 to small switch 322, the "vertical hop." Again, to accomplish this vertical hop, small switch 306 determines the data frame's D_ID. Small switch 306 then uses the D_ID with the routing table to retrieve the correct port to send the data frame out on. Small switch 306 then sends the data frame out the correct port, which is connected to small switch 322.

Small switch 322 also uses the data frame's D_ID to determine which port to send the data frame out on. In this case, the correct port is the port connected to the external destination device. Thus, small switch 322 sends the data frame to the external destination device.

Both horizontal and vertical hops are not always necessary. For a data frame entering small switch 312 from an external source device and to be sent to an external destination device connected to small switch 316, the data frame is first sent horizontally from small switch 312 to small switch 316, the horizontal hop. There is no vertical hop, since the external destination device is connected to small switch 316, which is in the same row as the small switch 312 to which the external source device is connected. From small switch 316, the data frame is sent to the external destination device.

While the discussion above details a routing scheme where the data is first sent horizontally and then vertically, other routing schemes can also be used. For example, the data could be sent vertically and then horizontally. Also, in other switches having multiple small switches, the small switches may not be arranged in rows and columns. In such a case, a different routing scheme appropriate to the arrangement of the small switches is used.

The discussion above details the physical connections between the small switches 302-332 in the 64-port switch. Virtual channels are used in addition to the physical connections. When data frames are sent between small switches 302-332, the data frame is sent on one of several virtual channels. In a described embodiment, there are eight virtual channels. Four of the virtual channels are reserved for use with data frames that are special cases, such as "high priority" data. Four of the virtual channels are used for general data flow through the 64-port switch 300.

Figure 4A:
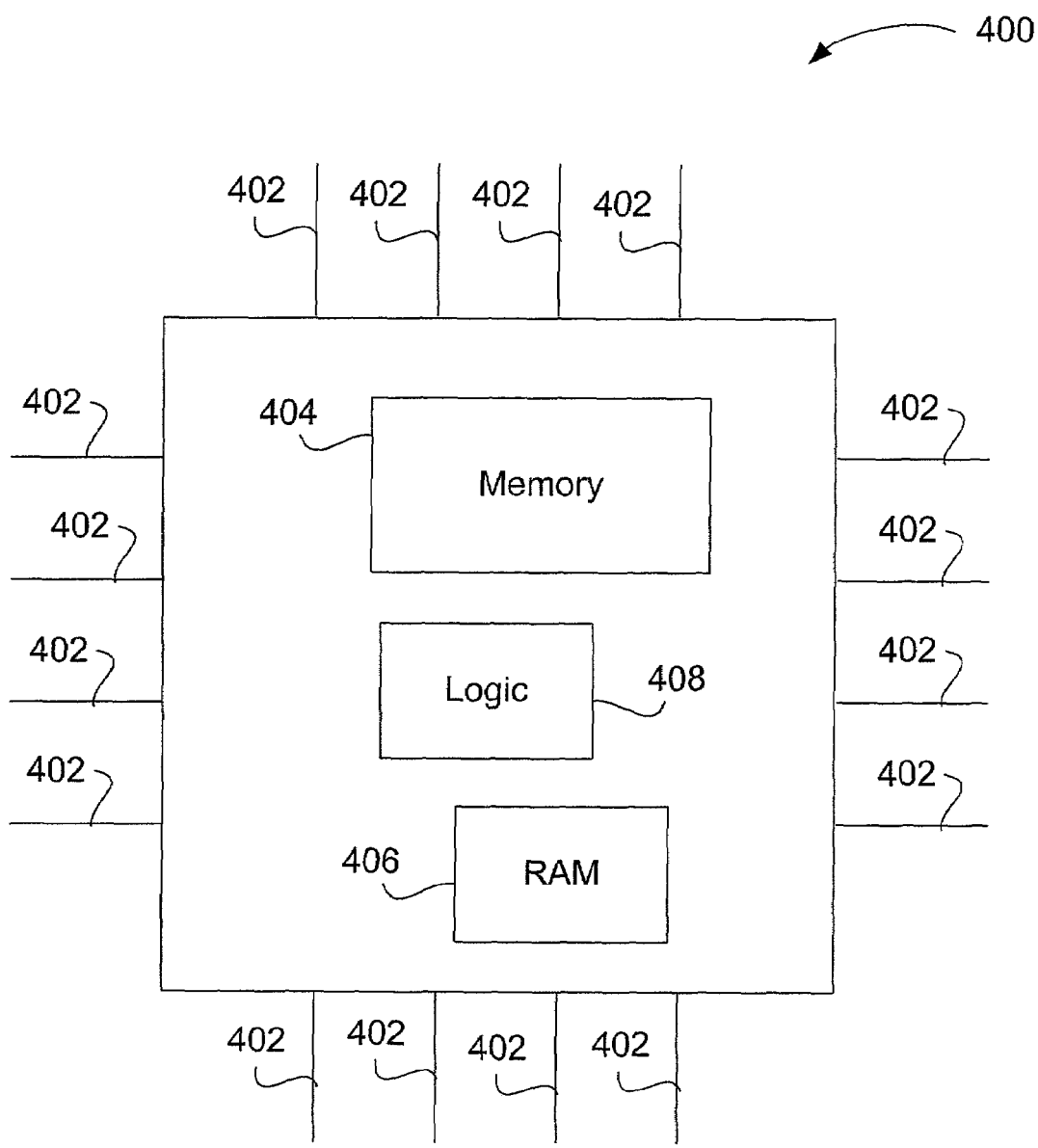
FIG. 4(a) is a block diagram of one of the small switches of FIG. 3.

FIG. 4(a) is a block diagram of a small switch 400. Small switch 400 illustrates the small switches 302-332 of FIG. 3 in more detail. The small switch 400 has sixteen ports 402. The small switch 400 further has a central memory 404, random access memory (RAM) 406, and logic 408 for storing and retrieving frames between the ports 402 and central memory 404. In one described embodiment, the small switch 400 is an application specific integrated circuit (ASIC), where the logic 408 is part of the ASIC hardware. However, other circuit types and other logic embodiments may also be used. All the ports 402 are capable of reading and writing to the memory simultaneously, which provides the small switch 400 with full non-blocking performance.

The central memory 404 has buffers managed by a list. The list tracks which buffers are free. The buffers are divided into several groups of buffers reserved for different purposes. A fixed number of buffers are reserved for each port 402. Additionally, there is a pool of buffers shared among the ports. When the buffers reserved for a specific port are full, the shared pool of buffers can be used with that port, if any are free.

Further, there are eight virtual channels available. Any of the eight virtual channels can be used with any port. These virtual channels act to divide each physical port into eight different virtual sub-ports. Four of the virtual channels are reserved for special circumstances, such as communication between switches in a fabric, transportation of multicast traffic through the fabric, and high priority data. Four of the virtual channels are used for general data flow. General data flow is the normal flow of data through the switch.

Within the buffers reserved for a specific port, a fixed number of buffers are reserved for each virtual channel. An additional pool of buffers is shared among all the virtual channels. In some embodiments, data frames arriving at a small switch 400 from an external port do not have virtual channels. In these embodiments, the buffers for external ports are not divided up between virtual channels. When a data frame is received at the small switch 400, the logic 408 of the small switch 400 determines which virtual channel carried the data frame to the small switch 400, and the data frame is sent to the buffers appropriate to that virtual channel.

The RAM 406 stores the routing table for the small switch. The routing table tells the small switch 400 which port the data should be sent out, based on the data's D_ID. Thus, when data frames are to be sent from the small switch 400, the logic 408 of the small switch 400 determines the D_ID from the data frame and uses the routing table stored in RAM 406 to determine which port 402 to send the data out on. The small switch 400 then sends the data out through the appropriate port 402. In some cases, the routing table also provides the identity of the virtual channel on which the data frame should be sent out.

The virtual channel rules are coded into the ASIC hardware. These virtual channel rules tell the small switch how to determine which virtual channel each data frame should be sent out on. The small switch 400 uses virtual channel rules to determine which virtual channel each data frame should be sent out on, and marks each data frame with information identifying the virtual channel on which the data frame is sent.

While the small switch 400 is described as a 16-port small switch, small switches with other port counts and data speeds can be used to form a large port count switch.

Figure 4B:
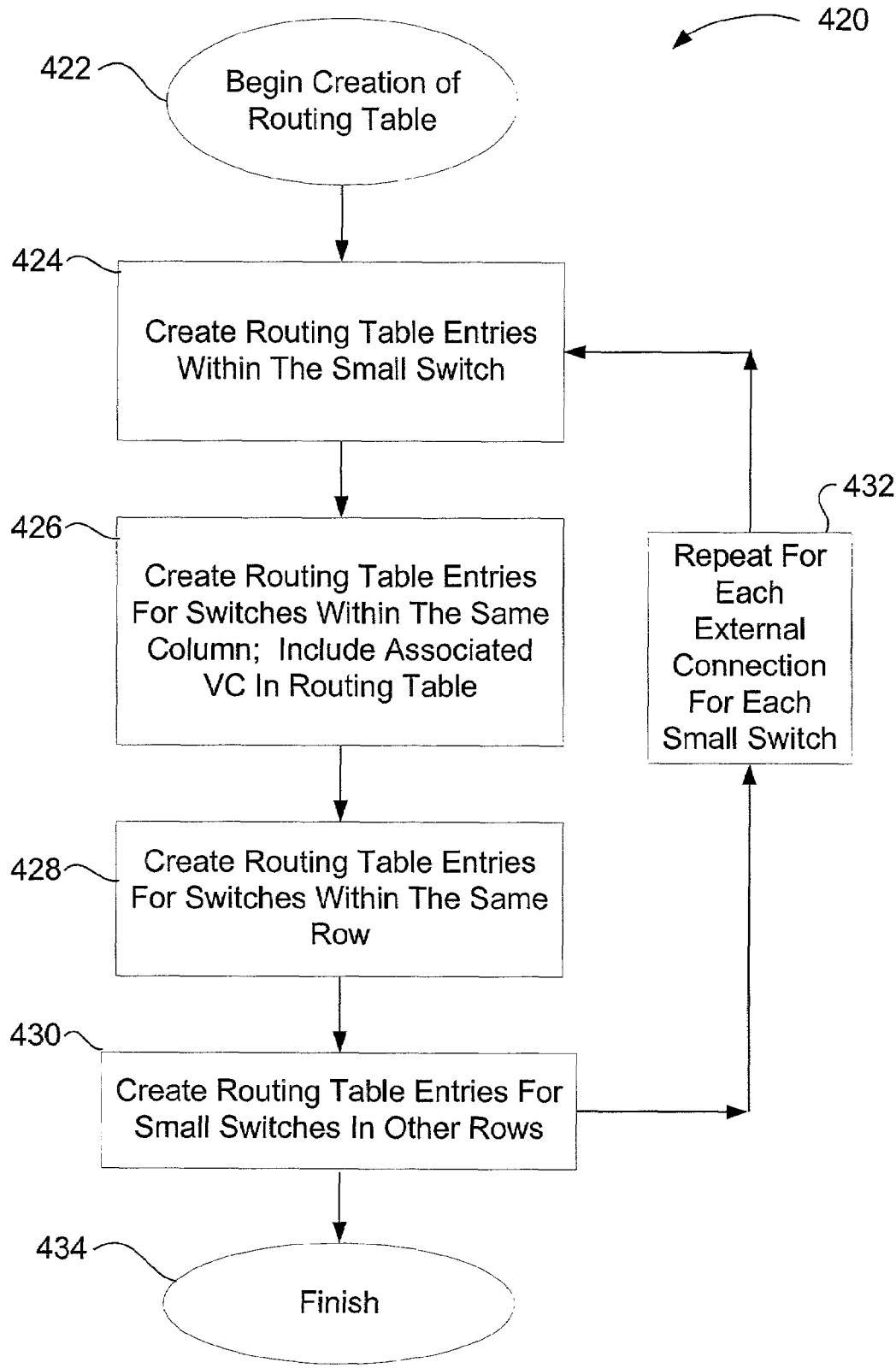
FIG. 4(b) is a flow chart illustrating an initialization process for a 64-port switch.

FIG. 4(b) is a flow chart 420 illustrating how the 64-port switch 300 creates routing tables for routing data frames through the 64-port switch. The processor of the 64-port switch 300 programs routing tables for all the small switches 302-332 during initialization of the 64-port switch 300.

The processor begins to create 422 the routing tables in the small switches 302-332 during initialization. For simplicity, and clarity of illustration, the creation of the routing tables is described with respect to entries for external connection 340 of small switch 302 of the 64-port switch 300. The processor creates routing table entries for the other external connections of the 64-port switch 300 in the same manner.

The routing table entries for routing data frames within small switch 302 are created 424 first. These routing table entries correctly route data frames that enter the small switch 302 and are bound for an external destination device connected to that same small switch 302 via connection 340. External connection 340 has an associated D_ID (known as the "340 D_ID"). The data frames may enter small switch 302 from one of the other external connections 334, 336, or 338, or from another small switch over one of the ISLs 342-364. The routing table within small switch 302 stores an indication that data frames with 340 D_ID are to be sent to the port associated with external connection 340. Thus, data frames received by small switch 302 and having a 340 D_ID are forwarded to the port associated with connection 340. The data frames are sent out the port, through external connection 340 to the proper destination.

Next, the processor of the 64-port switch 300 creates 426 routing table entries for data frames with a 340 D_ID within the other small switches 310, 318, and 326 in the same column as small switch 302. Under the first horizontal, then vertical routing rules, data frames that arrive at the small switch 302 from other small switches in the same column are destined for an external destination device connected to small switch 302. This is because the vertical hop is the last hop before the data frame leaves the 64-port switch for an external destination device. The processor creates routing table entries in each of the small switches in the same column as small switch 302 for external connection 340 of small switch 302. These routing table entries indicate that data frames with the 340 D_ID are to be sent out ports connected to small switch 302. For example, small switch 310 includes a routing table entry indicating that any data frame with a D_ID for external connection 340 will be sent to the ports connected to ISLs 354 and 356.

Each external connection 334-340 of small switch 302 is associated with a VC_ID. In one embodiment, there is one virtual channel associated with each of the external connections of the small switch. However, other embodiments may have more or fewer virtual channels than external connections in a small switch. As the processor creates the routing table entries in each small switches 310, 318, and 326 within the same column as small switch 302 for external connection 340, the small switches 310, 318, and 326 also store the VC_ID associated with external connection 340 in the routing table. In one embodiment, external connection 334 has a VC_ID of 2 associated with it, external connection 336 has virtual channel 3 associated with it, external connection 338 has virtual channel 4 associated with it, and external connection 340 has virtual channel 5 associated with it. The routing tables in small switches 310, 318, and 326 therefore store virtual channel 5 in association with D_ID 340.

Next, the processor adds entries to the routing tables of other small switches 304, 306, and 308 in the same row as small switch 302 corresponding to sending data frames to external connection 340 of small switch 302. For data frames with D_IDs indicating those frames should be sent out external connection 340, the processor creates entries in the routing tables of small switches 304, 306, and 308 indicating the data should be sent out ISLs 342 and 344, 346 and 348, or 350 and 352, respectively, to reach small switch 302. Under the routing rules of a first horizontal hop, then a second vertical hop, if a data frame is sent on a horizontal hop, it is the first hop after a small switch receives the data frame from an external source. Each external connection in the small switch that receives the data frame from an external source device is associated with a VC_ID. On the horizontal hop, the data frame is sent out on the virtual channel associated with the external source port through which the data frame arrived. In one embodiment, the routing table entry for D_IDs that indicate the data frame will be sent out through a port on a horizontal hop includes an indication that the virtual channel associated with the port through which the data frame arrived should be used with the data frame. In another embodiment, the virtual channel is not stored in the routing table. Instead, the logic 408 of the small switch 400 operates to send the data frame out on the virtual channel associated with the port through which the data frame arrived at the small switch.

Finally, the processor creates 430 routing table entries in the small switches in other rows for external connection 340 of small switch 302. Small switches 312, 314, and 316 send data frames bound for small switch 302 horizontally to small switch 310. Thus, the processor creates routing table entries in small switches 312, 314, and 316 indicating that data frames bound for D_ID 340 are sent out ports connected to small switch 310. For the horizontal hop, the small switches send the data frames on virtual channels associated with the external source port on which the data frames arrived. In some embodiments these virtual channels are stored in the routing table, while in other embodiments, the logic 408 operates to send the data frame out on the virtual channel associated with the port through which the data frame arrived at the small switch.

This process is repeated 432 for each external connection of each small switch. In each small switch, the processor creates routing table entries determining how data frames get to each destination connection through the 64-port switch. After all routing table entries have been created for every external connection of each small switch, the process is finished 434.

Figure 4C:
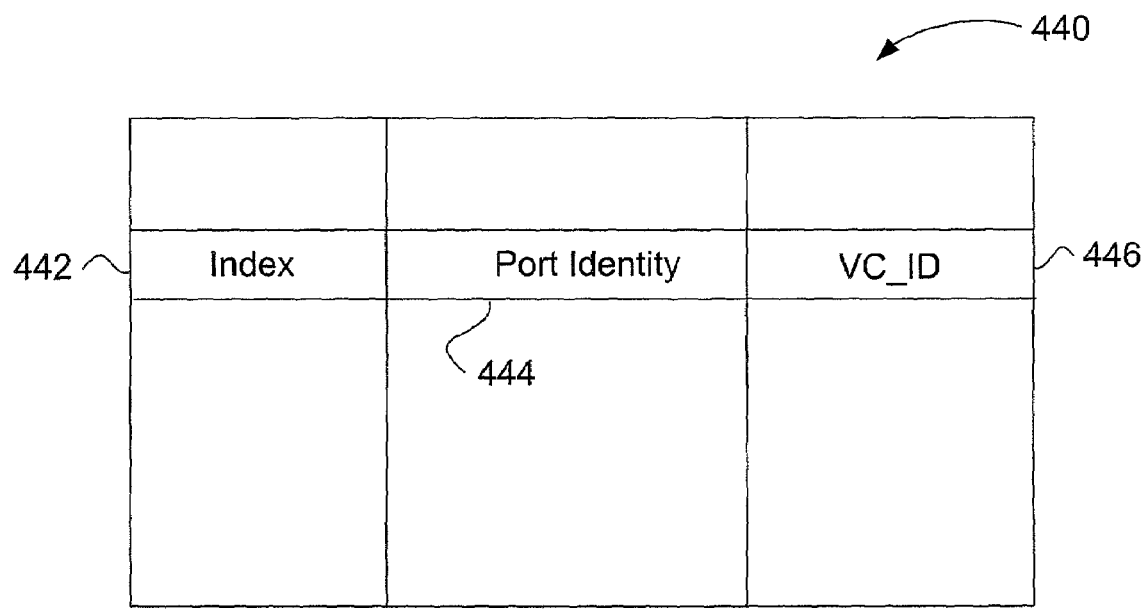
FIG. 4(c) is an illustration of the routing table.

FIG. 4(*c*) is an illustration of the routing table 440 created during initialization of the 64-port switch 300. Each D_ID is associated with a RAM address index in the routing table 440. Accordingly, the small switch uses the D_ID to find the proper index in the routing table 440. The small switch looks up the index in the routing table 440 and returns the identity of the port 444 associated with that D_ID. This is the port on which the data frame should be sent.

The routing table 440 further provides the VC_ID that should be used with the data frame's D_ID, if the data frame has not arrived at the small switch from an external connection. For example, a D_ID is associated with index 442. Looking up index 442 brings up the associated VC_ID 446. This is the VC_ID on which the data frame should be sent if the data frame has not arrived at the small switch from an external connection. Thus, given the D_ID, the small switch uses the routing table to provide the identity of the port through which the data frame should be sent on. Also, if the data frame has not arrived at the small switch from an external connection, the routing table provides the identity of the virtual channel on which the data frame should be sent.

Example of Congestion Without Virtual Channels

Figure 5:
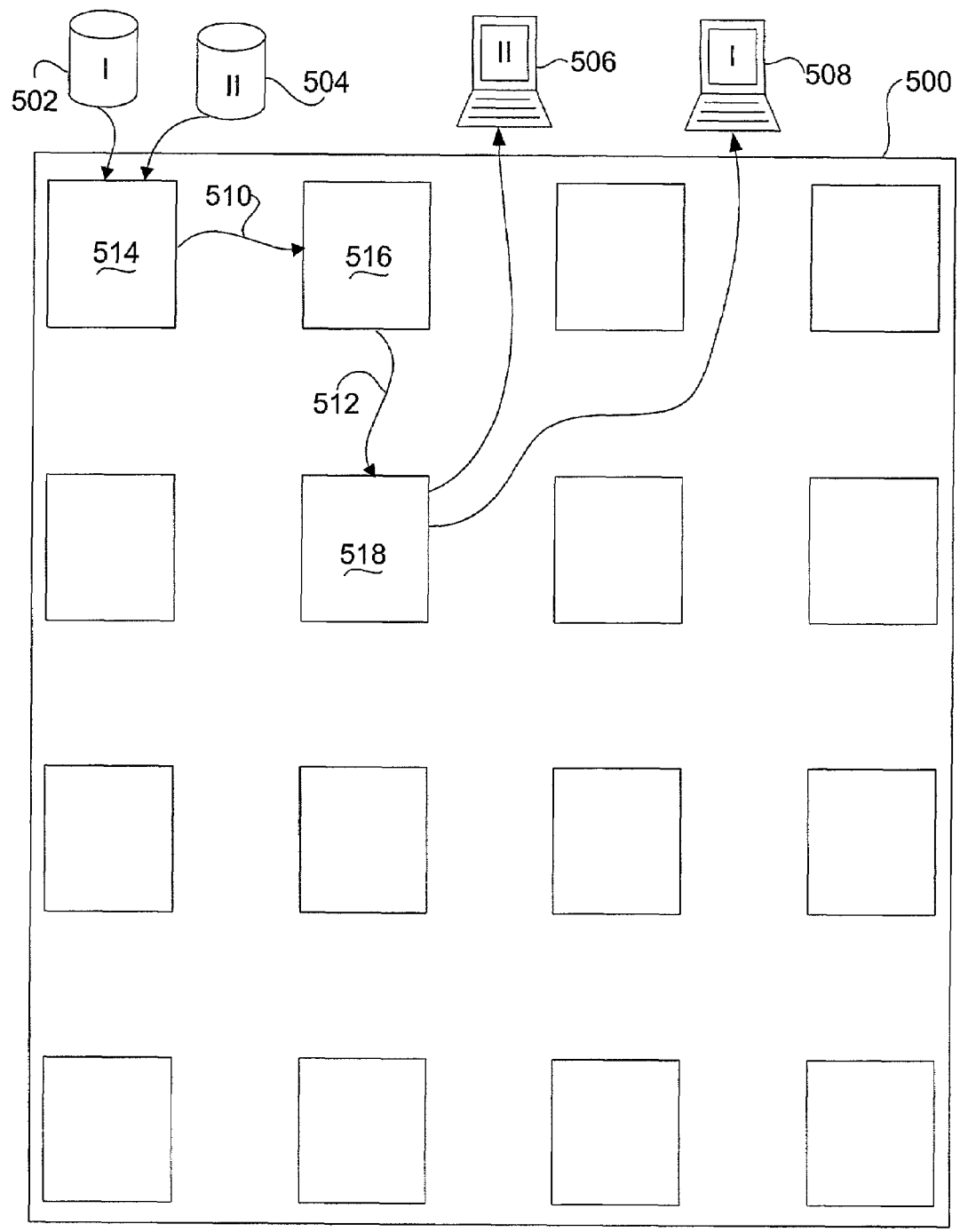
FIG. 5 is a block diagram illustrating how congestion affects performance in a 64-port switch.

FIG. 5 is a block diagram illustrating how congestion affects performance in a 64-port switch 500. The 64-port switch 500 is nearly identical to the 64-port switch 300, but the 64-port switch 500 lacks virtual channels. A first external source device 502 sends data through the 64-port switch 500 to a first external destination device 508. In the example used here, the source device 502 is a hard disk drive and the destination device 508 is a computer, but other source and destination devices can also be used.

The first external source device 502 sends data frames to the 64-port switch 500, which are initially received by small switch 514. Small switch 514 determines the D_ID of the data frames and, based on the D_ID, sends the data frames on the horizontal hop, to small switch 516 over connection 510. Connection 510 can be, for example, one or more ISLs. If connection 510 includes more than one ISL, the ISLs may be trunked, as mentioned above. Small switch 516, in turn, determines the D_ID of the data frames and, based on the D_ID, sends the data frames on the vertical hop, to small switch 518 over connection 512. Like connection 510, connection 512 can be, for example, one or more ISLs, which may be trunked. Small switch 518 then sends the data frames to the first external destination device 508.

However, the first external destination device 508 is incapable of receiving the incoming data frames as fast as the first external source device 502 sends the data frames, or as fast as the small switches 514, 516, and 518 send the data frames. Thus, at small switch 518, the data frames arrive faster than small switch 518 sends the data frames to the first external destination device 508. It is desirable that small switch 518 not discard frames. Thus, because the data frames arrive faster than they are sent out, data frames fill up the buffers of small switch 518, waiting to be sent out. Eventually, all of the buffers of small switch 518 are full. At this point, small switch 518 does not accept another data frame until a data frame stored in the buffer is sent to the first external destination device 508. When one of the data frames stored in the buffers of small switch 518 is sent to the external destination device 508, that buffer is then free to accept another data frame from small switch 516. In effect, at this point small switch 518 has been slowed to the speed of the first external destination device 508.

Because small switch 518 can no longer quickly accept the data frames from small switch 516, small switch 516 is no longer able to send the data frames to small switch 518 as quickly as the data frames arrive at small switch 516. Just as with small switch 518, data frames fill up the buffers of small switch 516. Eventually, all of the buffers of small switch 516 are filled and small switch 516 does not accept another data frame until a data frame stored in the buffer is sent to small switch 518. In this manner, the slow speed of external destination device 508 eventually slows down the entire path: small switch 518, connection 512, small switch 516, connection 510, and small switch 514.

The second external source device 504 sends data frames to the second external destination device 506 at the same time that the first external source device 502 is sending data frames to the first external destination device. The data frames traveling from the second external source device 504 to the second external destination device 506 travel the same path as the data frames traveling from the first external source device 502 to the first external destination device 508. The second external source device 504 sends data frames to the 64-port switch 500, which are initially received by small switch 514. Small switch 514 determines the D_ID of the data frames and sends the data frames on the horizontal hop, to small switch 516 over connection 510. Small switch 516, in turn, determines the D_ID of the data frames and sends the data frames on the vertical hop, to small switch 518 over connection 512. Small switch 512 then sends the data frames to the second external destination device 506.

Without virtual channels, the slowing effect that has affected the path from small switch 514 to small switch 518 also affects data frames traveling from the second external source device 504 to the second external destination device 506, since they travel over the affected, slowed path. Since the buffers at small switch 518 that are available to the port that receives data from connection 512 have been filled with data frames waiting to be sent to the first external destination device 508, small switch 518 cannot accept any data frames traveling over connection 512. Thus, small switch 518 cannot accept data frames traveling from the second external source device 504 to the second external destination device 506. Similarly, the buffers at small switch 516 that are available to the port that receives data from connection 510 have been filled with data frames that originated at the first external source device and are waiting to be sent to small switch 518. Therefore, small switch 516 cannot accept any data frames traveling over connection 510, and cannot accept data frames traveling from the second external source device 504 to the second external destination device 506. The data traveling from the second external source device 504 to the second external destination device 506 has been slowed by the congestion caused by the first external source device 502 and first external destination device 508.

Virtual Channels Used to Improve Quality of Service

Figure 6:
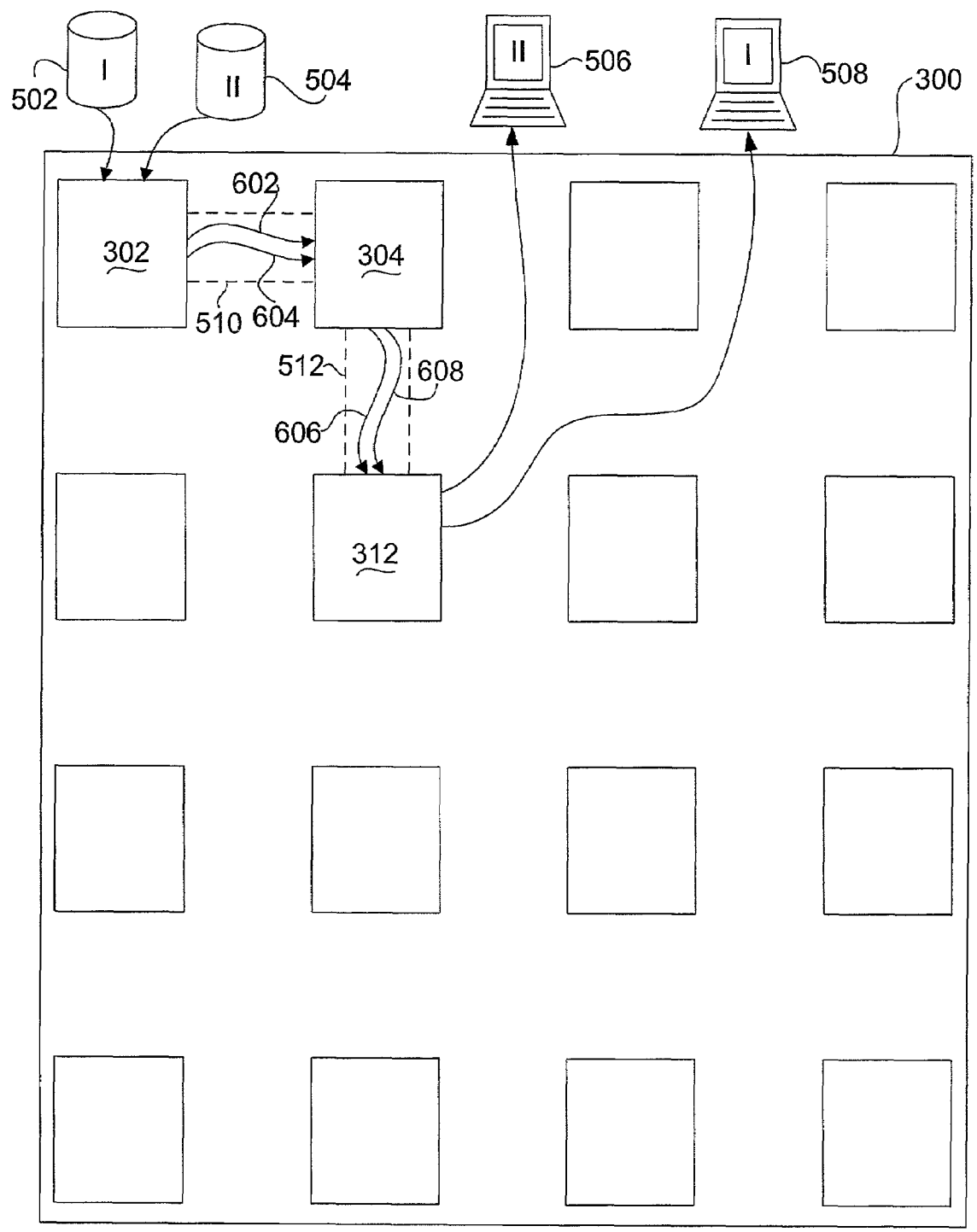
FIG. 6 is a block diagram illustrating the 64-port switch where virtual channels are used to improve quality of service.

FIG. 6 is a block diagram illustrating the 64-port switch 300 where virtual channels are used to improve quality of service. Just as in FIG. 5, a first external source device 502 sends data through the 64-port switch 300 to a first external destination device 508. However, in the 64-port switch 300 there are virtual channels. Through the use of the virtual channels, the congestion caused by the data flow from the first external source device 502 to the first external destination device 508 does not slow down the data flow from the second external source device 504 to the second external destination device 506.

The virtual channels discussed here are the four virtual channels available for general data flow, not the four virtual channels reserved for special circumstance data. General data entering the 64-port switch 300 travels between the small switches within the 64-port switch 300 on the four virtual channels available for such general data flow. Having four virtual channels for general data flow means there is a separate virtual channel for each external port of a small switch of the 64-port switch 300. This allows data coming in to a small switch from each external port to leave the small switch on a different virtual channel. This provides the advantage of having a separate data path for data from each external device and prevents the data from the devices from blocking each other. Similarly, if there are four destination devices attached to the external ports of the small switch, the four virtual channels prevent the data bound for the four different destination devices from blocking each other. While in the described embodiment, there is one virtual channel for each external connection in a small switch (i.e. four external connections in each small switch and four virtual channels), more or fewer virtual channels can also be used, although if fewer are used, there is a higher likelihood of some blocking. Each of the four virtual channels available for general data flow operates in the same manner, for the same type of general data.

The first external source device 502 sends data frames to the 64-port switch 300, which are initially received by small switch 302. Small switch 302 determines the D_ID and from the D_ID determines that the data frames will go on the horizontal hop to small switch 304, over connection 510. In one embodiment, connection 510 is a trunked pair of ISLs. Connection 510 has multiple virtual channels, including virtual channels 602 and 604. Small switch 302 determines that the data frames from the first external source device 502 should travel over virtual channel 602 to reach small switch 304. Small switch 302 provides marking information that identifies the data frames from the first external source 502 as traveling over virtual channel 602. This marking information takes the form of a virtual channel identification (VC_ID) in an inter-frame fill word (FILL) sent prior to the data frame. In one embodiment, the inter-frame fill word is an arbitration primitive (ARB), although other inter-frame fill words can also be used. Small switch 302 then sends the data frames from the first external source device 502 over virtual channel 602 to reach small switch 304.

Small switch 304 receives the data frames that originated at the first external source device 502 over virtual channel 602 in connection 510. From the marking information provided by small switch 302, small switch 304 determines that the data frames traveled over virtual channel 602. Thus, small switch 304 will only store the data frames from the first external source device 502 in the buffers reserved for virtual channel 602 or the buffers available for all virtual channels. Small switch 304 will not store the data frames that traveled over virtual channel 602 in the buffers that are reserved for virtual channel 604. The buffers reserved for virtual channel 604 remain free.

Small switch 304 then determines the D_ID of the data frames and determines that the data frames will go on the vertical hop to small switch 312 over connection 512. In one embodiment, connection 512 is a trunked pair of ISLs. Like connection 510, connection 512 has multiple virtual channels, including virtual channels 606 and 608. Small switch 304 determines from the D_ID that the data frames from the first external source 502 will be sent out the port in small switch 312 that is connected to external destination device 508. Based on the port of small switch 312 through which the data frames will be sent to the destination device, small switch 304 determines that the data frames should travel over virtual channel 606 to reach small switch 312. Small switch 304 provides marking information that identifies the data frames from the first external source 502 as traveling over virtual channel 606. Small switch 304 then sends the data frames from external source device 502 over virtual channel 606 to reach small switch 312.

Small switch 312 receives the data that originated at the first external source device 502 over virtual channel 606 in connection 512. From the marking information provided by small switch 304, small switch 312 determines that the data frames traveled over virtual channel 606. Thus, small switch 312 will only store the data frames from the first external source device 502 in the buffers reserved for virtual channel 606 or the buffers available for all virtual channels. Small switch 312 will not store the data frames that traveled over virtual channel 606 in the buffers that are reserved for virtual channel 608. The buffers reserved for virtual channel 608 remain free. Small switch 312 then determines the D_ID of the data frames and determines that the data frames will go to the first external destination device 508. Finally, small switch 312 sends the data frames to the first external destination device 508.

Just as with the example of FIG. 5, the first external destination device 508 is incapable of receiving the incoming data frames as fast as the first external source device 502 sends the data frames, or as fast as the small switches transmit the data frames. Thus, at small switch 312, the data frames arrive faster than small switch 312 can send the data frames to the first external destination device 508. Thus, data frames fill up the buffers of small switch 312, waiting to be sent out.

However, small switch 312 includes a separate pool of buffers for each virtual channel. The data frames from the first external source device 502 arrive at small switch 312 over virtual channel 606. Therefore, the buffers that are reserved for virtual channel 606, as well as the buffers available to all virtual channels ("common buffers"), fill up. However, the buffers that are reserved for other virtual channels, such as virtual channel 608, remain free.

Eventually, all of the buffers in small switch 312 that are reserved for virtual channel 606, and all the common buffers, are full. At this point, small switch 312 does not accept another data frame arriving over virtual channel 606 until a data frame stored in the virtual channel 606 buffers or common buffers is sent to the first external destination device 508. When one of the data frames stored in these buffers is sent to the external destination device 508, that buffer is then free to accept another data frame from small switch 304 sent over virtual channel 606. However, since the buffers reserved for virtual channel 608 remain free, small switch 312 can still accept data frames arriving over virtual channel 608.

Small switch 312 can no longer quickly accept the data frames sent from small switch 304 over virtual channel 606. Therefore, small switch 304 is no longer able to send the data frames to small switch 312 over virtual channel 606 as quickly as the data frames arrive at small switch 304 over virtual channel 602. Data frames fill up the buffers reserved for virtual channel 602 and the common buffers of small switch 304. Eventually, all of the buffers reserved for virtual channel 602 and common buffers of small switch 304 are filled and small switch 304 does not accept another data frame over virtual channel 602 until a data frame stored in the virtual channel 602 buffers or common buffers is sent to small switch 312. Again, the buffers within small switch 304 that are reserved for virtual channel 604 remain free, and small switch 304 can still accept data frames arriving over virtual channel 604.

Small switch 304 can no longer quickly accept the data frames sent from small switch 302 over virtual channel 602. Therefore, small switch 302 is no longer able to send the data frames to small switch 304 over virtual channel 602 as quickly as the data frames arrive at small switch 302 through the port connected to the first external source device. Data frames fill up the buffers reserved for the port connected to the first external source device, and the buffers available to all ports. Eventually, all the buffers reserved for the port connected to the first external source device and all the buffers available to all ports are filled and small switch 302 does not accept another data frame from the first external source device 502 until a data frame stored in the buffers reserved for the port connected to the first external source device or the buffers available to all ports is sent to small switch 304. However, the buffers within small switch 302 that are reserved for the ports connected to the other external devices, including the port connected to the second external source device 504, remain free, and small switch 302 can still accept data frames arriving from the second external source device 504.

As shown in the discussion above, the slow speed of external destination device 508 eventually slows down the virtual channel path from the first external source device 502 to the first external destination device 508: the first external source device 502, small switch 302, virtual channel 602 in connection 510, virtual channel 606 in connection 512, and small switch 312.

However, the slowdown caused by the first external destination device 508 does not affect the speed of data frames sent from the second external source device 504 to the second external destination device 506. Data frames traveling from the second external source device 504 to small switch 302 are not slowed. The second external source device 504 is connected to the small switch 302 through a different port than the first external source device 502. Small switch 302 includes a different set of buffers reserved for each port. Thus, small switch 302 no includes a separate set of buffers for data frames arriving from the second external source device 504. Small switch 302 can accept data frames from the second external source device 504 at full speed, since small switch 302 has buffers that can accept the data frames.

The data frames that originated at the second external source device 504 are sent from small switch 302 to small switch 304 over virtual channel 604. Small switch 304 has a separate set of buffers reserved for virtual channel 604. Because the buffers reserved for data frames arriving over virtual channel 604 remain free, small switch 304 can accept the data frames that originated at the second external source device 504 without any slow down.

Small switch 304 then sends the data frames that originated at the second external source device 504 to small switch 312 over virtual channel 608. Small switch 304 determines that the data frames should be sent over virtual channel 608 from the D_ID of the data frames. Then, based on the port of small switch 312 through which the data frames will be sent to the destination device, small switch 304 determines that the data frames should travel over virtual channel 608 to reach small switch 312. Small switch 312 has a separate set of buffers reserved for virtual channel 608. Because the buffers reserved for data frames arriving over virtual channel 608 remain free, small switch 312 can accept the data frames that originated at the second external source device 504 at full speed. Finally, small switch 312 sends the data frames that originated at the second external source device 504 to the second external destination device 506.

Therefore, as detailed above, there are buffers available in every step of the path between the second external source device 504 and the second external destination device 506. Even if congestion exists on the physical path between the source and destination, the use of virtual channels allows a free, uncongested path between source and destination. The use of virtual channels means that congestion caused by the slow first external destination device 508 does not affect the transmission of data frames from the second external source device 504 to the second external destination device 506.

Figure 7A:
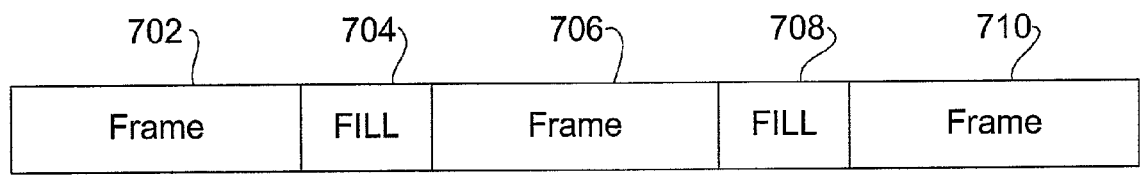
FIG. 7(a) is a block representation of data frames sent between the small switches.

FIG. 7(a) is a block representation of data sent between the small switches. When data frames, such as data frames 702, 706, and 710, are transmitted, the last bits of a data frame do not immediately precede the first bits of the next data frame. Instead, the frames are separated by inter-frame fill words (FILLs), such as FILLs 704 and 708. As stated previously, in some embodiments, the FILLs are arbitration primitives. The FILL is not part of the data frame, but contains information about the data frame that follows that particular FILL. Thus, FILL 704 contains information about data frame 706, and FILL 708 contains information about data frame 710.

One type of information carried by the FILL is the identification of the virtual channel (the "VC_ID") for the data frame which follows the FILL. The small switch determines the virtual channel that a data frame will travel over. The small switch puts the marking information in the form of the VC_ID for the virtual channel used by the data frame in the FILL preceding that data frame. Thus, in FIG. 7(a), FILL 704 provides the VC_ID for data frame 706, and FILL 708 provides the VC_ID for data frame 710.

When the data frame arrives at the next small switch, the FILL with the VC_ID precedes the data frame. The receiving small switch determines the VC_ID for the following frame from the FILL that precedes the data frame and sends the data frame to the appropriate go buffers.

Figure 7B:
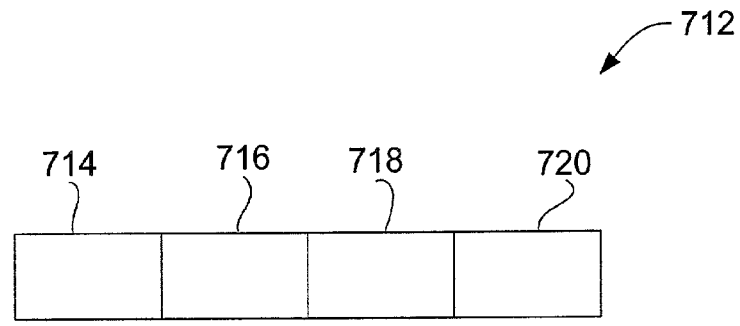
FIG. 7(b) is a block representation of the inter-frame fill word that is sent between data frames.

FIG. 7(b) is a block representation of an embodiment of the FILL 712 that is sent between the data frames. Each FILL 712 comprises four bytes 714, 716, 718, and 720. The first two bytes 714 and 716 identify the data as an FILL 712, and the second two bytes 718 and 720 carry information for the data frame that follows that particular FILL 712. One type of information carried by the second two bytes 718 and 720 of the FILL 712 is the VC_ID for the data frame which follows the FILL.

Figure 8A:
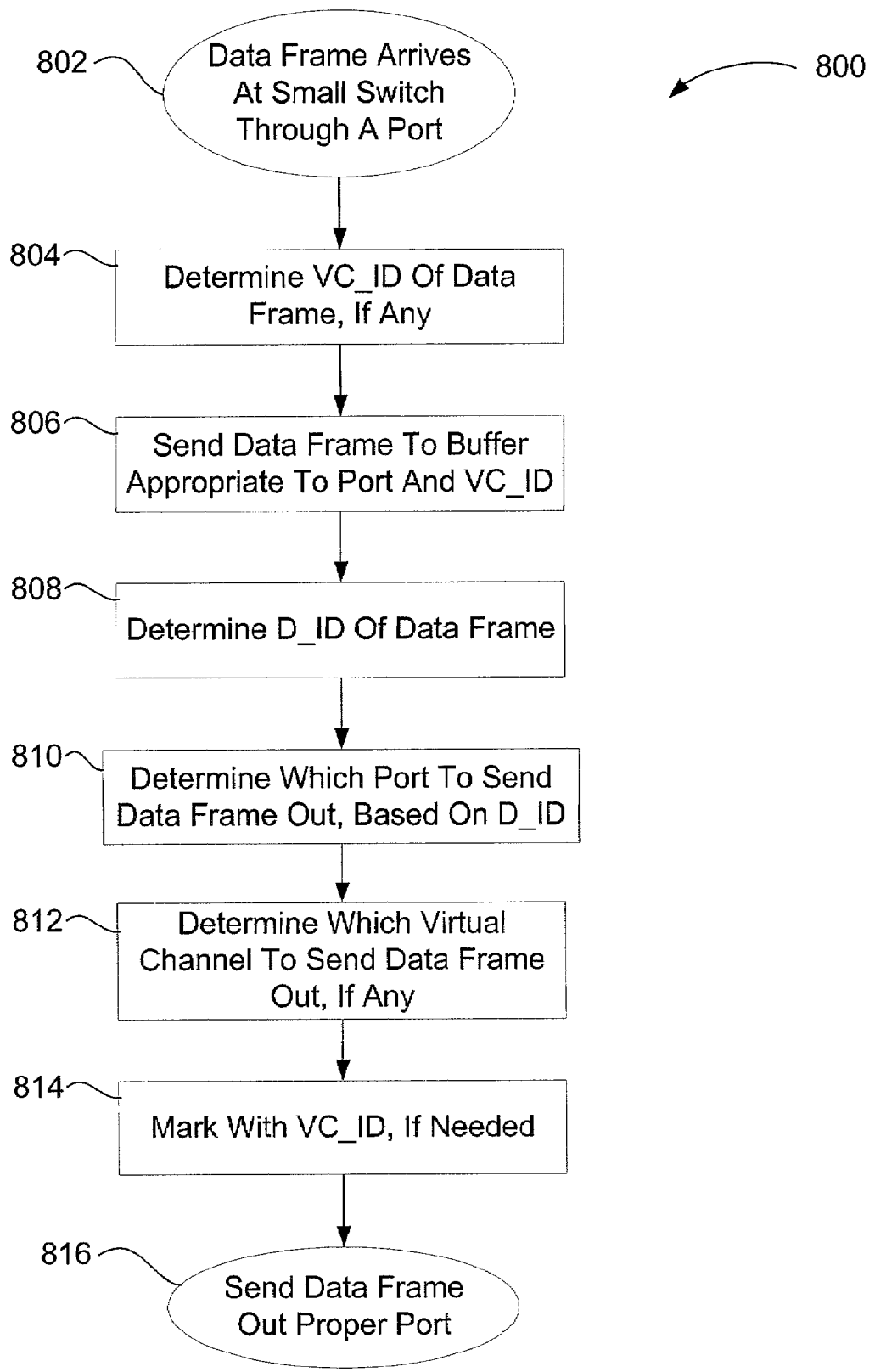
FIG. 8(a) is a flow chart detailing processes performed by a small switch when that small switch receives a data frame.

FIG. 8(a) is a flow chart 800 detailing processes performed by a small switch when that small switch receives a data frame. In one embodiment where the small switch is an ASIC, these processes are performed by the logic 408 hardware of the small switch. The data frame arrives 802 at the small switch through one of the small switch's sixteen ports. The small switch stores the identity of the port through which the data frame arrived. The small switch determines 804 from the FILL preceding the data frame whether the data frame has a VC_ID, and if so, what the VC_ID is for that data frame.

The small switch sends 806 the data frame to a buffer appropriate to that frame's port of arrival and VC_ID. By sending the data frame to the appropriate buffer, the small switch prevents congestion between one source and destination from affecting data flow between another source and destination that travels over the same physical path, as described above.

When the small switch is to send the data frame out of the small switch, the small switch determines 808 the D_ID of the data frame. This D_ID is found within the data frame itself. The small switch uses the D_ID of the data frame to determine 810 through which port the data frame will be sent. Each possible D_ID corresponds to a port in the small switch on which the data should be sent out. The small switch uses the D_ID to determine the index of a routing table entry stored in the small switch. The index is then used to look up in the routing table the correct port through which to send the data frame.

Depending on the data frame's destination, the data frame may have to be sent out to another small switch. Alternatively, the data frame could be sent to an external device that is directly connected to the small switch. Where the data frame is sent to next does not affect the process of determining which port the data frame should be sent out on. The small switch simply uses the D_ID with the routing table to determine the correct port to send out the data frame. If the data frame is to be sent to another small switch, the routing table will tell the small switch to send the data frame out through a port that is connected to the other small switch. If the data frame is to be sent directly to an external device connected to the small switch, the routing table will tell the small switch to send the data frame out through a port that is connected to the external device. Thus, by determining the correct port, the small switch determines the correct immediate destination for the data frame.

The small switch next determines 812 which virtual channel to send the data frame on, if any. A new virtual channel calculation is performed for each hop between small switches. Therefore, at each small switch, there is a new determination on which virtual channel, if any, the data frame will be sent out. There are eight possible virtual channels. Four of the virtual channels are reserved for special circumstances, such as high priority data. This leaves four virtual channels for general data frames traveling through the large port count switch. Since each of these four virtual channels is for general, standard data, they each have the same priority level. The small switch first determines whether the data frame should be sent out on one of the virtual channels reserved for special circumstances. If so, the data frame will be sent out on that virtual channel. If not, the small switch determines which of the four virtual channels for general data flow the data frame should be sent out on, if any. If the data frame is sent to an external device from the small switch, it is likely that external device will have no capability or need to interpret the VC_ID of the data frame. In such case, no virtual channel need be used with the data frame. However, in some embodiments, virtual channels are also used when the data frame is sent out to an external device.

After the small switch determines which virtual channel the data frame will be sent out on, the small switch marks 814 the data frame with the VC_ID that identifies the virtual channel. This is done by including the correct VC_ID in the FILL preceding the data frame. This will allow a receiving small switch to determine the virtual channel on which the data frame was sent. If no virtual channel is needed, the small switch may omit this step.

Finally, the small switch sends 816 the data frame out the proper port, as determined by the routing table. Since the small switch sends the data frame out the proper port, the data frame will arrive at the correct destination. Also, the data frame has been marked with information identifying the virtual channel that the data frame was sent on, so a small switch receiving the data frame will be able to correctly place the data frame in the correct buffer upon receipt.

Figure 8B:
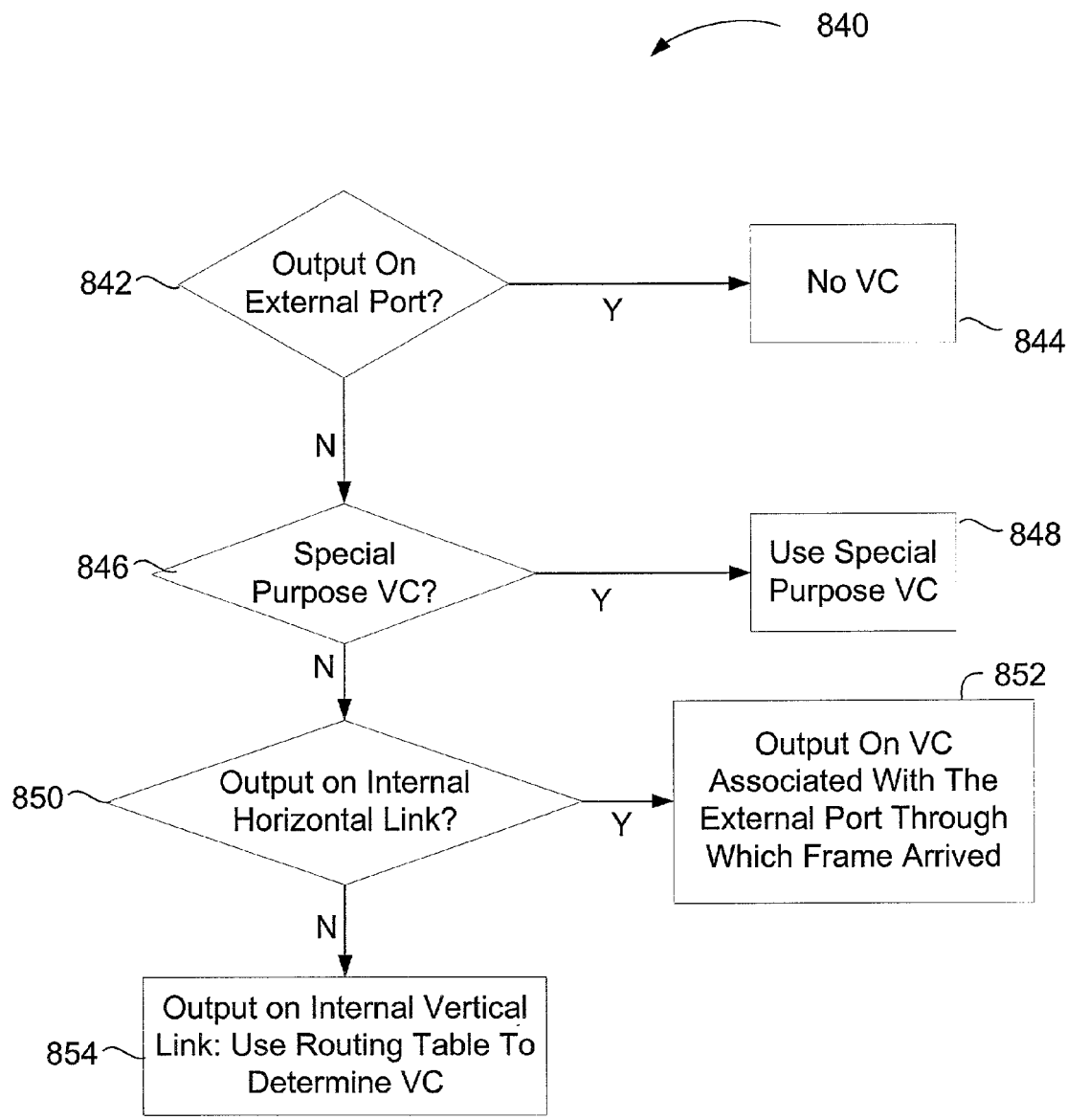
FIG. 8(b) is a flow chart detailing how the small switch determines on which virtual channel the data frame should be sent.

FIG. 8(b) is a flow chart 840 detailing how the small switch determines 812 on which virtual channel the data frame should be sent. FIG. 8(b) thus illustrates the virtual channel rules. The small switch determines 842 whether the port on which the data frame will be output is an external port. In a described embodiment, if the port is an external port, no virtual channel is used 844, since the data frame will be sent directly to an external device and no virtual channel is necessary. However, in some embodiments, it is possible to use virtual channels when sending data frames to external devices as well.

If the port is not an external port, the small switch determines 846 if the data frame should be sent out on one of the four special purpose virtual channels. The small switch determines this from the start-of-frame delimiter for the data frame and the D_ID of the data frame. If the data frame should be sent out on one of the four special purpose virtual channels, that virtual channel is used 848, instead of one of the four virtual channels for general data flow.

In one embodiment, the four special purpose virtual channels operate as follows. If the data frame is for switch-to-switch communications, such as fabric initialization, the highest priority virtual channel is used. Another virtual channel is reserved for data frames for high-priority device-to-device data frame traffic. Finally, two virtual channels are used for multicast and broadcast data frames. In some embodiments, each of the four special purpose virtual channels has higher priority than the four general data traffic virtual channels. In other embodiments, some of the special purpose virtual channels are configurable to have higher, lower, or the same priority as the general data traffic virtual channels.

If the data frame should not be sent out on one of the four special virtual channels, the small switch determines 850 whether to send the data frame on an internal horizontal hop. If the data frame is to be sent on a horizontal hop, then it is the first hop within the 64-port switch 300 for the data frame. This is because if a data frame is to be sent on an internal horizontal hop, the data frame arrived at the small switch through one of the external ports. In that case, the small switch will output 852 the data frame using the virtual channel associated with that external port. Each external port is associated with one of the virtual channels. Thus, by determining the external port through which the data frame arrived, the small switch determines on which virtual to send out the data frame.

If the data frame will not be sent on an internal horizontal hop, it will be sent on an internal vertical hop. For vertical hops, the small switch uses the routing table, as shown in FIG. 4(*c*), to determine 854 on which virtual channel to output the data frame.

Figure 9:
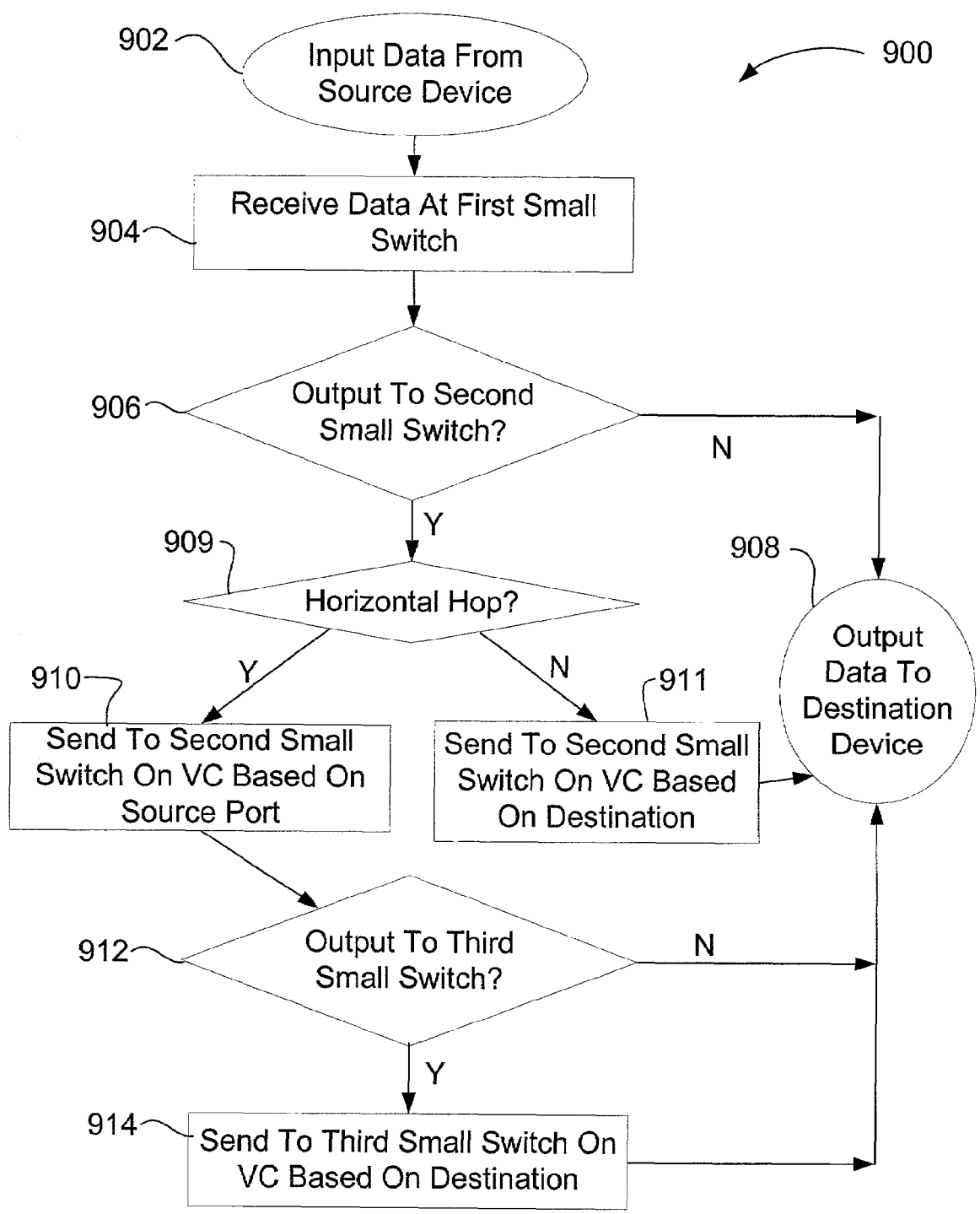

FIG. 9 is a flow chart 900 detailing a data frame's complete trip through the 64-port switch. FIG. 9 also illustrates how each small switch determines which of the virtual channels available for general data flow on which to output the data frame. As stated above, the calculation of the correct virtual channel to use for each hop changes as the data frame flows through the different small switches in the 64-port switch. The discussion of FIG. 9 assumes that the data frame is not to be sent on one of the special purpose virtual channels. The data frame is first input 902 to the 64-port switch from the source device. The input data frame is received 904 at the small switch that has a port connected to the source device.

The first small switch determines 906 from the D_ID of the data frame and the first small switch's routing table whether the data frame will be sent to a second small switch. The first small switch does this by using the D_ID for the data frame with the routing table to determine which port to send the data frame out. The data frame will be either sent directly out to a destination device connected to a port of the first small switch or sent to a second small switch within the 64-port switch 300.

If the data frame is not to be sent to a second small switch, the small switch will have used the D_ID of the data frame and the routing table to determine that the correct port through which to send the data frame is an external port. In some embodiments, the set of virtual channel rules in the first small switch provides that no virtual channel is necessary if the data frame is sent out a port connected to an external device. In such a case, no virtual channel is used in the described embodiment, although in other embodiments virtual channels are used when sending data frames to external devices. The data frame is output 908 out the port determined from the routing table to the destination device and the process ends.

However, if the data frame is to be sent through a port connected to a second small switch within the 64-port switch, the first small switch will send the data frame out on a virtual channel. What virtual channel is used is partially determined by whether the data frame is sent on a horizontal or vertical hop.

The first small switch determines 909 whether the data frame will be sent on a horizontal hop. If the data frame will be sent to a second small switch on a horizontal hop, the first small switch sends 910 the data frame to the second small switch on a virtual channel based on the port through which the data frame arrived from the external device. For arriving data frames, each port connected to an external device is associated with one of the four virtual channels available for general data flow. If the data frame arrived through a port connected to an external device, the first small switch sends the data out on a horizontal hop on the virtual channel associated with that port. Since each small switch has four ports connectable to external devices, and there are four virtual channels available for general data flow, this method provides separate virtual channels for data arriving from separate external devices. Thus, the first small switch sends 910 the data frame to the second small switch on a virtual channel based on the port through which the data frame arrived at the first small switch.

If the data frame will not be sent to the second small switch on a horizontal hop, the data frame will be sent on a vertical hop. The vertical hop is the last hop within the 64-port switch, so after a vertical hop the data frame will be sent from the second small switch to the external destination device. The first small switch uses the D_ID of the data frame with the routing table to determine which virtual channel to use with the data frame when sending the data frame to the second small switch. The first small switch sends 911 the data frame to the second small switch on a virtual channel based on the external port through which the data frame will eventually be sent out of the 64-port switch. The second small switch then determines from the D_ID and the routing table which port to send the data frame out to the external destination device. The second small switch then outputs 908 the data frame through the port determined from the routing table to the destination device and the process ends.

If the first small switch sent the data frame to the second small switch on a horizontal hop, the data frame will be sent from the second small switch either to a third small switch or directly to a destination device connected to a port of the second small switch. The second small switch determines 912 whether the data frame will be output to a third small switch. The second small switch uses the D_ID and the routing table to determine through what port to send the data frame. The determined port is connected either to a third small switch or to an external device.

If the data frame is to be sent to a third small switch, the second small switch sends 914 the data frame on a virtual channel. The second small switch determines from the D_ID and the routing table which virtual channel to use. The second hop is a vertical hop, so the virtual channel used will be the virtual channel associated with the external connection in the third small switch. The third small switch will output the data frame to an external device. After the third small switch receives the data frame from the second small switch, the third small switch determines from the D_ID and the routing table on what port the data frame should be output. The third small switch then outputs 908 the data frame to the destination device and the process ends. In some embodiments, no virtual channel is necessary when the third small switch outputs 908 the data frame to the external destination device.

If the data frame is not to be sent to a third small switch, the second small switch determined from the D_ID and the routing table that the data frame is to be sent to an external device from the second small switch. In some embodiments, no virtual channel is necessary if the data frame is sent out a port connected to an external device. In such a case, no virtual channel is used in the described embodiment, although in other embodiments virtual channels are used when sending data frames to external devices. The second small switch outputs 908 the data frame to the destination device and the process ends.

Figure 10:
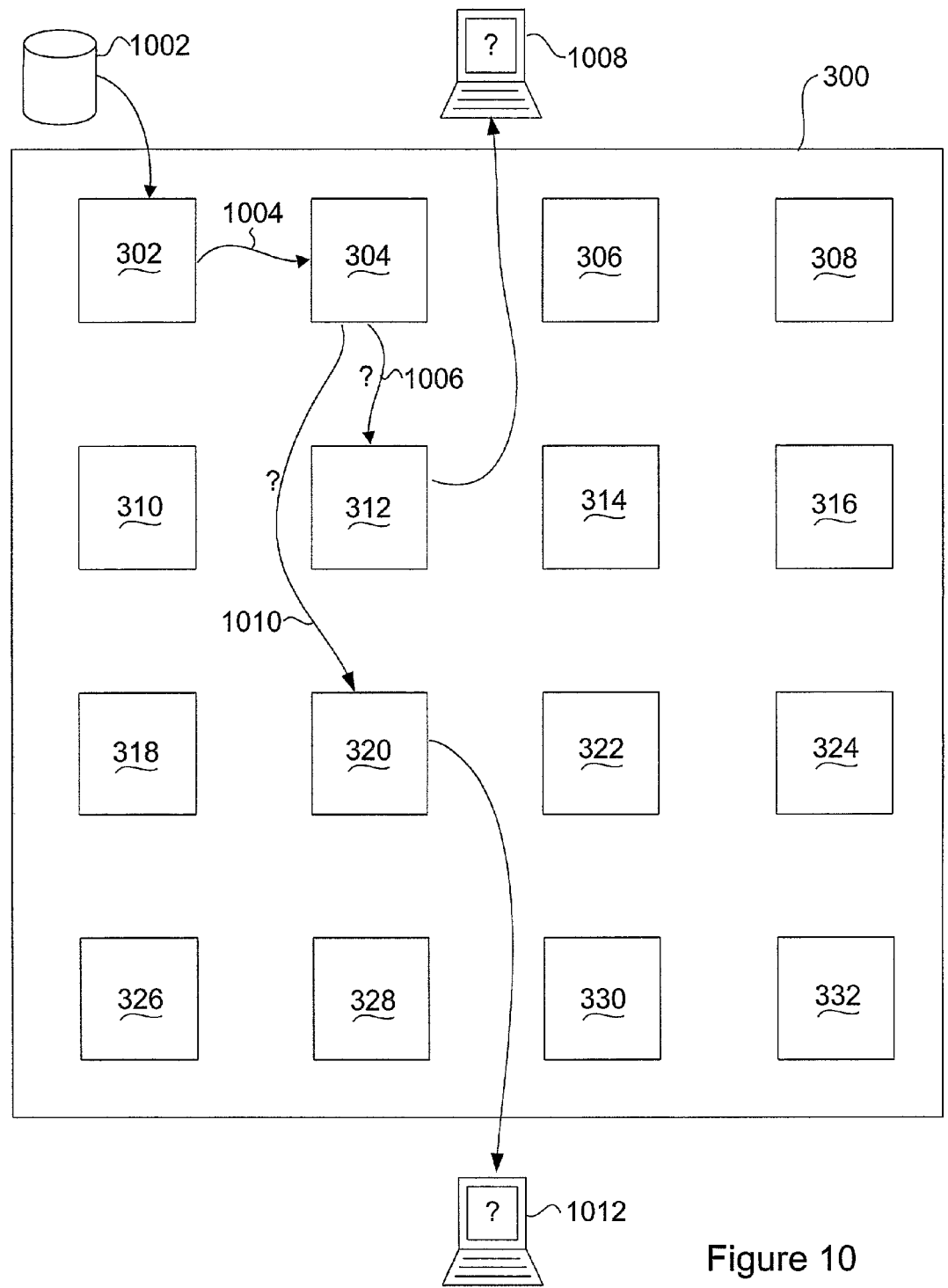
FIG. 10 is a block diagram illustrating how the first small switch determines which of the virtual channels to use to send the data frame on a horizontal hop to the second small switch.

FIG. 10 is a block diagram illustrating how the first small switch 302 determines which of the four virtual channels available for general data flow to use to send the data frame to the second small switch 304. This is a horizontal hop. This assumes that one of the four special purpose virtual channels is not being used, and that the external destination device is not connected to the first small switch 302. The external source device 1002 is connected to a physical port of the first small switch 302. Thus, any data sent from the external source 1002 arrives at the first small switch 302 through that physical port.

The physical port through which the data frame arrives at the first small switch 302 determines which virtual channel is used to send the data frame on a horizontal hop to the second small switch 304. In the 64-port switch 300, each small switch has four physical ports connectable to external devices. Also, there are four virtual channels available for use to send data between the small switches. Each of the four physical ports connectable to an external device is associated with a different one of the four virtual channels. Thus, data sent from separate external devices to the first small switch will be sent from the first small switch to a second small switch on separate virtual channels. This helps prevent data to one external device from slowing data to another external device.

The virtual channel used to send the data frame on a horizontal hop from the first small switch 302 to the second small switch 304 is based on the port of the first small switch 302 that is connected to the external source of the data frame. The first small switch 302 simply sends the data frame out through the virtual channel associated with the port that the data frame arrived through. In FIG. 10, the data frame arrived at small switch 302 through the port associated with virtual channel 1004. Thus, as shown in FIG. 10, the first small switch 302 sends the data to the second small switch via virtual channel 1004.

For the horizontal hop between small switches 302 and 304, it does not matter what the final destination of the data frame is. The virtual channel 1004 used to send the data frame from the first small switch 302 to the second small switch 304 is based on the port connected to the external source 1002 of the data frame. The destination for the frame data does not affect which virtual channel is used to send the data frame from the first small switch 302 to the second small switch 304. It does not matter if the data's final destination is external destination device 1008, which would be reached by virtual channel 1006, external destination device 1012, which would be reached by virtual channel 1010, or some other destination device.

Figure 11:
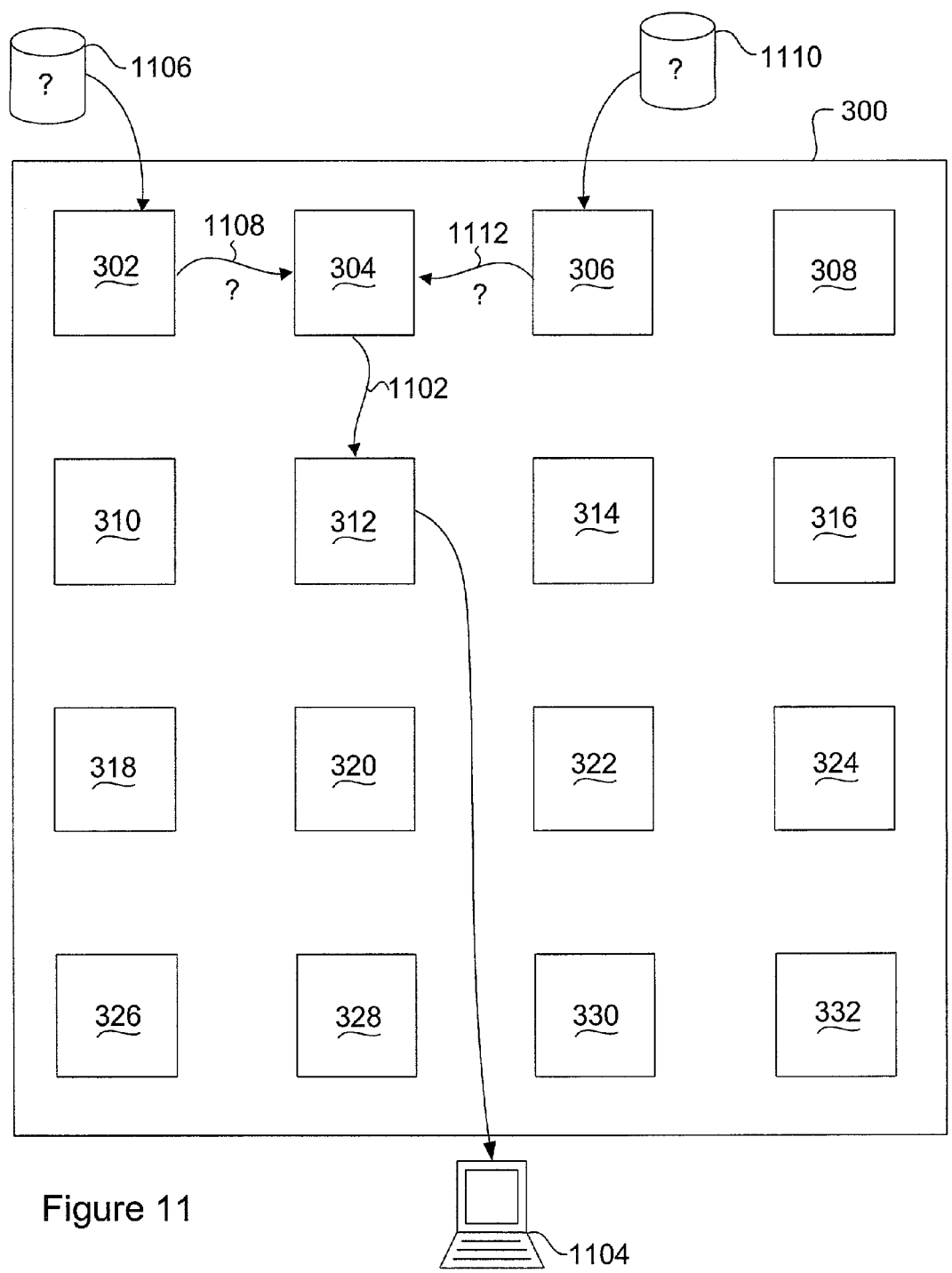
FIG. 11 is a block diagram illustrating how a small switch determines which of the virtual channels to use to send the data frame on a vertical hop to another small switch.

FIG. 11 is a block diagram illustrating how a small switch 304 determines which of the four virtual channels available for general data flow to use to send the data frame on a vertical hop. In the situation illustrated in FIG. 11, the vertical is a second hop, from a second small switch 304 to a third small switch 312. However, the vertical hop may also be the first hop. The determination of the virtual channel for a vertical hop is the same whether it is a first or second hop. In FIG. 11, one of the four special purpose virtual channels is not being used, and the external destination device is not connected to the second small switch 304. The external destination device 1104 is connected to a physical port of the third small switch 312. Thus, any data sent to the external destination device 1104 will be sent through that physical port.

The physical port of the third small switch 312 through which the data is sent to the external destination device 1104 determines which virtual channel is used to send data on a vertical hop from the second small switch 304 to the third small switch 312. In the 64-port switch 300, each small switch has four physical ports connectable to external devices. There are four virtual channels available for use to send data between small switches. Each of the four physical ports connectable to an external device is associated with a different one of the four virtual channels. Thus, data sent from the third small switch to separate external devices will be sent from the second small switch to the third small switch on separate virtual channels. This helps prevent data from one external device from slowing data from another external device.

The virtual channel used to send the data frame on the vertical hop from the second small switch 304 to the third small switch 312 is based on the port of the third small switch connected to the external destination for the data frame. The second small switch 304 sends the data frame out through the virtual channel associated with the port of the third small switch through which the data will be sent to the external destination device 1104. The second small switch 304 determines the correct virtual channel by using a routing table as shown in FIG. 4(*c*). In FIG. 11, the data frame will travel to the external destination device 1104 through the port associated with virtual channel 1102. Thus, as shown in FIG. 11, the second small switch 304 sends the data to the third small switch via virtual channel 1102.

For the second jump between small switches 304 and 312, it does not matter what the original source of the data frame was. The virtual channel 1102 that carries the data from the second small switch 304 to the third small switch 312 is based on the port of the third small switch 312 that is connected to the external destination for the data. It does not matter if the data's source was external source device 1106, in which case the data would have been carried from small switch 302 by virtual channel 1108, external source device 1110, in which case the data would have been carried from small switch 306 by virtual channel 1112, or some other source device connected to small switch 304 or another small switch.

It is understood that the examples discussed herein are purely illustrative. For example, referring back to FIG. 3, the 64-port switch 300 could be replaced by a switch having a different number of small switches, or with different arrangements of small switches. The 64-port switch 300 could also use different routing rules and virtual channel rules. Further, the small switches could have a different number of ports and a different number of virtual channels.

We claim:

1. A method for sending Fibre Channel data frames through a Fibre Channel switch, the Fibre Channel switch comprising a plurality of small switches, the Fibre Channel data frames having a source and a destination, the destination being used for routing the Fibre Channel data frame, comprising:
receiving the Fibre Channel data frame from the source at a first small switch;
choosing a first virtual channel from a set of possible virtual channels, each virtual channel of the set of possible virtual channels being available for use with general data flow;
providing information in addition to the Fibre Channel data frame to identify the first virtual channel; and
sending the Fibre Channel data frame and the additional information identifying the first virtual channel from the first small switch to a second small switch,
wherein:
the additional information identifying the first virtual channel is included in an inter-frame fill word; and
the inter-frame fill word is sent from the first small switch to the second small switch prior to the Fibre Channel data frame.

2. A method for sending Fibre Channel data frames through a Fibre Channel switch, the Fibre Channel switch comprising a plurality of small switches, the Fibre Channel data frames having a source and a destination, the destination being used for routing the Fibre Channel data frame, comprising:
receiving the Fibre Channel data frame from the source at a first small switch;
choosing a first virtual channel from a set of possible virtual channels, each virtual channel of the set of possible virtual channels being available for use with general data flow;
providing information in addition to the Fibre Channel data frame to identify the first virtual channel; and
sending the Fibre Channel data frame and the additional information identifying the first virtual channel from the first small switch to a second small switch,
wherein:
the first small switch has a set of source ports capable of connecting to external devices;
the Fibre Channel data frame is received at the first small switch from the source through a first source port of the set of external ports; and
the first virtual channel is chosen from the set of possible virtual channels based on the identity of the first source port.

3. The method of claim 2, wherein:
the number of virtual channels in the set of possible virtual channels is equal to or greater than the number of source ports in the set of source ports;
each source port is associated with at least one virtual channel from the set of possible virtual channels; and
the first virtual channel is associated with the first source port.

4. The method of claim 3, wherein each virtual channel is associated with no more than one source port.

5. The method of claim 2, wherein:
the number of virtual channels in the set of possible virtual channels is equal to the number of source ports in the set of source ports;
each source port is associated with one virtual channel from the set of possible virtual channels; and
the first virtual channel is associated with the first source port.

6. The method of claim 2, further comprising storing the received Fibre Channel data frame in a buffer associated with the first source port.

7. A method for sending Fibre Channel data frames through a Fibre Channel switch, the Fibre Channel switch comprising a plurality of small switches, the Fibre Channel data frames having a source and a destination, the destination being used for routing the Fibre Channel data frame, comprising:
receiving the Fibre Channel data frame from the source at a first small switch;
choosing a first virtual channel from a set of possible virtual channels, each virtual channel of the set of possible virtual channels being available for use with general data flow;
providing information in addition to the Fibre Channel data frame to identify the first virtual channel;
sending the Fibre Channel data frame and the additional information identifying the first virtual channel from the first small switch to a second small switch
determining the destination of the Fibre Channel data frame; and
retrieving an identity of a port from a routing table, the port identity being associated with the destination in the routing table,
wherein:
the Fibre Channel data frame and the additional information identifying the first virtual channel are sent from the first small switch to the second small switch through the port;
the Fibre Channel switch further comprises a processor connected to each of the plurality of small switches; and
the processor sends at least one routing table entry to each of the plurality of small switches, each of the small switches storing the entry in the routing table, the entry comprising a destination and a port identity associated with the destination.

8. A method for sending Fibre Channel data frames through a Fibre Channel switch, the Fibre Channel switch comprising a plurality of small switches, the Fibre Channel data frames having a source and a destination, the destination being used for routing the Fibre Channel data frame, comprising:
receiving the Fibre Channel data frame from the source at a first small switch;
choosing a first virtual channel from a set of possible virtual channels, each virtual channel of the set of possible virtual channels being available for use with general data flow;
providing information in addition to the Fibre Channel data frame to identify the first virtual channel;
sending the Fibre Channel data frame and the additional information identifying the first virtual channel from the first small switch to a second small switch receiving the Fibre Channel data frame from the first small switch at the second small switch;

choosing a second virtual channel from a set of possible virtual channels;

providing information in addition to the original Fibre Channel data frame to identify the second virtual channel; and sending the Fibre Channel data frame and the additional information identifying the second virtual channel from the second small switch to a third small switch, wherein:

the Fibre Channel switch further comprises a processor connected to each of the plurality of small switches; and the processor sends at least one routing table entry to each of the plurality of small switches, each of the small switches storing the entry in the routing table, the entry comprising a destination and a virtual channel associated with the destination.

9. A Fibre Channel small switch operable to receive and output Fibre Channel data frames using virtual channels, comprising:

a plurality of ports including a plurality of source ports capable of connecting to external devices;

a plurality of buffers, each buffer being associated with a respective virtual channel;

a memory storing an identity of a virtual channel associated with each source port and available for general data flow; and logic operable to determine an identification of a destination of the Fibre Channel data frame and to determine an identification of a virtual channel available for general data flow on which to output received data; and in response to the small switch receiving the Fibre Channel data frame through a first source port of the plurality of source ports, to retrieve a first virtual channel identifier identifying a first virtual channel associated with the first source port from the memory, to provide information in addition to the Fibre Channel data frame to identify the first virtual channel, and to output the Fibre Channel data frame and the additional information identifying the first virtual channel.

10. The small switch of claim 9, wherein the identification of the virtual channel available for general data flow on which to output received data is determined based on the source of the data.

11. The small switch of claim 9, wherein the identification of the virtual channel available for general data flow on which to output received Fibre Channel data frames is determined based on the destination of the Fibre Channel data frame.

12. The small switch of claim 9, wherein the first virtual channel is associated with the first source port.

13. The small switch of claim 9, wherein the first virtual channel identifier is obtained from a routing table.

14. The small switch of claim 13, wherein the first virtual channel is associated with a destination of the Fibre Channel data frame.

15. The small switch of claim 13, wherein:

the additional information identifying the first virtual channel is included in an inter-frame fill word; and the inter-frame fill word is output preceding the output of the Fibre Channel data frame.

16. The small switch of claim 13, the logic further being operable to, in response to receiving the Fibre Channel data frame and determining the identification of a virtual channel used with the received Fibre Channel data frame, storing the Fibre Channel data frame in a buffer associated with the virtual channel.

17. A method for processing a Fibre Channel data frame at a small Fibre Channel switch, the small Fibre Channel switch having a plurality of ports, comprising:

receiving the Fibre Channel data frame through a first one of the plurality of ports;

determining a virtual channel of a plurality of virtual channels available for general data flow on which the Fibre Channel data frame was received;

storing the Fibre Channel data frame in one of a plurality of buffers, the buffer being associated with the virtual channel on which the Fibre Channel data frame was received;

determining an identity of a destination of the Fibre Channel data frame;

determining which port to output the Fibre Channel data frame through;

determining an identity of a virtual channel to output the Fibre Channel data frame on;

providing information in addition to the original Fibre Channel data frame that identifies the virtual channel on which the Fibre Channel data frame is output; and outputting the Fibre Channel data frame and the additional information through the determined port.

18. The method of claim 17, wherein the small Fibre Channel switch is within a larger Fibre Channel switch, the larger Fibre Channel switch comprising a plurality of small Fibre Channel switches.

19. The method of claim 18, wherein the larger Fibre Channel switch further comprises a processor connected to each of the plurality of small Fibre Channel switches.

20. The method of claim 17, wherein the buffer is further associated with the port through which the Fibre Channel data frame was received.

21. The method of claim 17, wherein determining the identity of the virtual channel used to output the Fibre Channel data frame comprises retrieving the identity of the virtual channel from an inter-frame fill word received by the small Fibre Channel switch prior to receiving the Fibre Channel data frame.

22. The method of claim 17, wherein the identity of the virtual channel to output the Fibre Channel data frame on is determined based on the source of the Fibre Channel data frame.

23. The method of claim 17, wherein the identity of the virtual channel to output the Fibre Channel data frame on is determined based on the destination of the Fibre Channel data frame.

24. The method of claim 17, wherein determining through which port to output the Fibre Channel data frame comprises retrieving the identity of the port associated with the identity of the destination of the Fibre Channel data frame from a routing table stored in a memory of the small switch.

25. The method of claim 17, wherein determining the identity of the virtual channel to output the Fibre Channel data frame on comprises retrieving the identity of the virtual channel associated with the identity of the destination of the Fibre Channel data frame from a routing table stored in a memory of the small switch.

26. The method of claim 25, wherein the small Fibre Channel switch is within a larger Fibre Channel switch, the larger Fibre Channel switch comprising a plurality of small Fibre Channel switches.

27. The method of claim 26, wherein the larger Fibre Channel switch further comprises a processor connected to each of the plurality of small Fibre Channel switches.

28. The method of claim 27, further comprising:
sending a routing table entry from the processor to the small Fibre Channel switch, the entry comprising the destination and a virtual channel identity associated with the destination; and
storing the routing table entry in the routing table stored in the memory of the small Fibre Channel switch.

29. The method of claim 17, wherein:
the additional information that identifies the virtual channel on which the Fibre Channel data frame is output comprises including the identity of the virtual channel to an inter-frame fill word associated with the Fibre Channel data frame; and
outputting the Fibre Channel data frame and the additional information through the determined port comprises outputting the inter-frame fill word and then outputting the Fibre Channel data frame.

30. A Fibre Channel switch operable to receive and output Fibre Channel data frames using virtual channels, comprising:
a plurality of small switches, each small switch comprising:
a memory; and
a plurality of ports including a plurality of external ports for connection to external devices and a plurality of internal ports for connection to other small switches;
a plurality of buffers, each buffer being associated with a respective virtual channel;
a memory storing an identity of a virtual channel associated with each external port and available for general data flow; and
logic operable to determine an identification of a destination of the Fibre Channel data frame and to determine an identification of a virtual channel on which to output received Fibre Channel data frame; and
a processor connected to each of the plurality of small switches;
wherein each small switch is connected to a subset of the plurality of small switches via internal ports.

31. The small switch of claim 30, wherein the processor sends at least one routing table entry to each of the plurality of small switches, each of the small switches storing the entry in the routing table, the entry comprising a destination and a virtual channel associated with the destination.

32. The method of claim 30, wherein the identification of the virtual channel available for general data flow on which to output received Fibre Channel data frame is determined based on the source of the Fibre Channel data frame.

33. The method of claim 30, wherein the identification of the virtual channel available for general data flow on which to output received Fibre Channel data frame is determined based on the destination of the Fibre Channel data frame.

34. A Fibre Channel switch operable to receive and output Fibre Channel data frames using virtual channels, the switch comprising:
a plurality of ports including a plurality of source ports for coupling to external devices to receive Fibre Channel data frames from the external devices;
a plurality of buffers, each buffer being associated with a respective virtual channel; and
logic operable to determine an identification of a destination of the Fibre Channel data frames for routing purposes based on the destination address of the Fibre Channel data frame, to determine an identification of a virtual channel available for general data flow on which to output received Fibre Channel data frames, the determination of the virtual channel based on the source port receiving the Fibre Channel data frames, and to direct the received Fibre Channel data frame to the buffer associated with the identified virtual channel.

35. The switch of claim 34, further comprising:
a memory storing an identity of the virtual channel associated with each source port and available for general data flows.

36. The switch of claim 34, wherein the plurality of ports further includes a plurality of output ports for outputting Fibre Channel data frames,
wherein each buffer is further associated with an output port so that the plurality of buffers is organized with buffers for each virtual channel being associated with each output port, and
wherein the logic directs the received Fibre Channel data frame to a buffer associated with the identified virtual channel and with the output port, which is determined based on an output port routing determination from the identified destination of the Fibre Channel data frame.

37. The switch of claim 36, wherein the logic includes a routing table for each source port and wherein the routing table indicates the virtual channel and output port for the Fibre Channel data frame.

38. A Fibre Channel switch for switching Fibre Channel data frames, the switch comprising:
a first small Fibre Channel switch; and
a second small Fibre Channel switch coupled to the first small Fibre Channel switch,
wherein each small Fibre Channel switch includes:
a plurality of ports including a plurality of external ports for coupling to external devices and a plurality of internal ports for connection to a small Fibre Channel switch;
a plurality of buffers, each buffer associated with a respective virtual channel; and
logic operable to determine an identification of a destination of a Fibre Channel data frame for routing purposes based on the destination address of the Fibre Channel data frame and to determine an identification of a virtual channel available for general data flow to apply to received Fibre Channel data frames, wherein the identification of the virtual channel can be done by one of at least two bases,
wherein the first small Fibre Channel switch uses a first basis to identify the virtual channel and the second small Fibre Channel switch uses a second, different basis to identify the virtual channel,
wherein the first basis to identify the virtual channel utilizes the external port which receives the Fibre Channel data frame; and
wherein the second basis to identify the virtual channel utilizes the external port which transmits the Fibre Channel data frame.

39. A Fibre Channel switch for switching Fibre Channel data frames, the switch comprising:
a first small Fibre Channel switch; and
a second small Fibre Channel switch coupled to the first small Fibre Channel switch, wherein each small Fibre Channel switch includes:
a plurality of ports including a plurality of external ports for coupling to external devices and a plurality of internal ports for connection to a small Fibre Channel switch;
a plurality of buffers, each buffer associated with a respective virtual channel; and
logic operable to determine an identification of a destination of a Fibre Channel data frame for routing purposes based on the destination address of the Fibre Channel data frame and to determine an identification of a virtual channel available for general data flow to apply to received Fibre Channel data frames, wherein the identification of the virtual channel can be done by one of at least two bases,
wherein the first small Fibre Channel switch uses a first basis to identify the virtual channel and the second small Fibre Channel switch uses a second, different basis to identify the virtual channel,
wherein each buffer is further associated with an external port so that the plurality of buffers is organized with buffers for each virtual channel being associated with each external port, and
wherein the logic directs the received Fibre Channel data frame to a buffer associated with the identified virtual channel and with the output external port, which is determined based on an output port routing determination from the identified destination of the Fibre Channel data frame.

40. The switch of claim 39, wherein the logic includes a routing table for each external port and wherein the routing table indicates the virtual channel and output port for the Fibre Channel data frame.

* * * * *